United States Patent
Davis et al.

(10) Patent No.: US 9,737,110 B2
(45) Date of Patent: *Aug. 22, 2017

(54) INFLATABLE BLADDERS FOR USE IN FOOTWEAR AND OTHER ARTICLES OF MANUFACTURE

(71) Applicant: Reebok International Limited, London (GB)

(72) Inventors: Paul M. Davis, Blackstone, MA (US); Frank Millette, Middleborough, MA (US); Paul E. Litchfield, Westboro, MA (US)

(73) Assignee: Reebok International Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 14/949,351

(22) Filed: Nov. 23, 2015

(65) Prior Publication Data

US 2016/0073729 A1    Mar. 17, 2016

Related U.S. Application Data

(60) Continuation of application No. 14/033,129, filed on Sep. 20, 2013, now Pat. No. 9,198,477, which is a
(Continued)

(51) Int. Cl.
*A43B 13/20*    (2006.01)
*A43B 23/00*    (2006.01)
(Continued)

(52) U.S. Cl.
CPC ............... *A43B 7/14* (2013.01); *A43B 7/32* (2013.01); *A43B 13/203* (2013.01); *A43B 17/03* (2013.01);
(Continued)

(58) Field of Classification Search
CPC ......... A43B 13/20; A43B 13/38; A43B 17/00; A43B 17/006; A43B 17/03; A43B 23/029
(Continued)

(56) References Cited

U.S. PATENT DOCUMENTS 1,193,608 A * 8/1916 Poulson ............... A43B 17/03
36/153
2,080,469 A * 5/1937 Gilbert ................. A43B 17/03
36/153
(Continued)

*Primary Examiner* — Marie Bays
(74) *Attorney, Agent, or Firm* — Sterne, Kessler, Goldstein & Fox P.L.L.C.

(57) ABSTRACT

The present invention is a method for manufacturing inflatable bladders for use in articles of manufacture. The method includes the steps of providing a first polymer film, applying a curable release coating to the polymer film in a pattern that corresponds to the configuration of the inflatable bladder, curing the release coating to the first polymer film, providing a second polymer film with the first polymer film to form a layered element such that the release coating is disposed between the polymer films, positioning the layered element between two plies of material, applying heat and pressure to adhere the polymer films together except in the area where the release coating has been applied to form an inflatable compartment surrounded by a sealed perimeter, and removing the plies of material from the adhered first and second polymer films.

20 Claims, 19 Drawing Sheets

Related U.S. Application Data division of application No. 12/903,129, filed on Oct. 12, 2010, now Pat. No. 8,572,786.

(51) Int. Cl.

| | |
|---|---|
| *A43B 7/14* | (2006.01) |
| *A43B 17/03* | (2006.01) |
| *A43B 23/02* | (2006.01) |
| *A43D 27/00* | (2006.01) |
| *B29C 33/58* | (2006.01) |
| *B29C 33/64* | (2006.01) |
| *B29C 37/00* | (2006.01) |
| *B29C 65/02* | (2006.01) |
| *B29C 65/08* | (2006.01) |
| *B29C 65/18* | (2006.01) |
| *B29C 65/00* | (2006.01) |
| *B29D 35/14* | (2010.01) |
| *A43B 7/32* | (2006.01) |
| *A43D 111/00* | (2006.01) |
| *B29C 65/26* | (2006.01) |
| *B32B 7/14* | (2006.01) |
| *B32B 37/12* | (2006.01) |
| *B32B 38/00* | (2006.01) |
| *B29C 65/14* | (2006.01) |
| *B29C 65/74* | (2006.01) |
| *B29C 35/08* | (2006.01) |
| *B29L 22/02* | (2006.01) |
| *B29L 31/50* | (2006.01) |
| *B29L 31/00* | (2006.01) |
| *B29C 65/04* | (2006.01) |

(52) U.S. Cl.
CPC ............ *A43B 23/029* (2013.01); *A43D 27/00* (2013.01); *A43D 111/00* (2013.01); *B29C 33/58* (2013.01); *B29C 33/64* (2013.01); *B29C 37/0067* (2013.01); *B29C 65/02* (2013.01); *B29C 65/085* (2013.01); *B29C 65/086* (2013.01); *B29C 65/087* (2013.01); *B29C 65/18* (2013.01); *B29C 65/26* (2013.01); *B29C 66/004* (2013.01); *B29C 66/1122* (2013.01); *B29C 66/244* (2013.01); *B29C 66/439* (2013.01); *B29C 66/7212* (2013.01); *B29C 66/83413* (2013.01); *B29C 66/83433* (2013.01); *B29D 35/146* (2013.01); *B32B 7/14* (2013.01); *B32B 37/1292* (2013.01); *B32B 38/004* (2013.01); *B29C 37/0075* (2013.01); *B29C 65/04* (2013.01); *B29C 65/14* (2013.01); *B29C 65/1412* (2013.01); *B29C 65/1425* (2013.01); *B29C 65/74* (2013.01); *B29C 66/0042* (2013.01); *B29C 66/0342* (2013.01); *B29C 66/5326* (2013.01); *B29C 66/5346* (2013.01); *B29C 66/61* (2013.01); *B29C 66/71* (2013.01); *B29C 66/712* (2013.01); *B29C 66/723* (2013.01); *B29C 66/727* (2013.01); *B29C 66/7392* (2013.01); *B29C 66/7394* (2013.01); *B29C 66/73713* (2013.01); *B29C 66/73921* (2013.01); *B29C 66/8161* (2013.01); *B29C 66/8181* (2013.01); *B29C 66/81455* (2013.01); *B29C 66/8242* (2013.01); *B29C 2035/0827* (2013.01); *B29C 2793/009* (2013.01); *B29K 2995/007* (2013.01); *B29L 2022/025* (2013.01); *B29L 2031/504* (2013.01); *B29L 2031/7496* (2013.01); *B29L 2031/7506* (2013.01); *B32B 2037/1253* (2013.01); *B32B 2255/24* (2013.01); *B32B 2262/101* (2013.01); *B32B 2315/085* (2013.01); *B32B 2327/18* (2013.01); *B32B 2437/02* (2013.01); *Y10T 156/108* (2015.01); *Y10T 428/1352* (2015.01)

(58) Field of Classification Search
USPC .................................. 36/28, 29, 43, 44, 45
See application file for complete search history.

(56) References Cited

U.S. PATENT DOCUMENTS

| | | | | |
|---|---|---|---|---|
| 2,080,499 | A * | 5/1937 | Nathansohn | A43B 17/03 36/153 |
| 2,865,097 | A * | 12/1958 | Vollrath, Jr. | A43B 17/18 12/142 R |
| 3,795,994 | A * | 3/1974 | Ava | A43B 13/16 36/29 |
| 4,017,931 | A * | 4/1977 | Golden | A43B 17/03 12/146 B |
| 4,271,606 | A * | 6/1981 | Rudy | A43B 13/223 36/29 |
| 4,297,797 | A * | 11/1981 | Meyers | A43B 5/00 36/153 |
| 5,514,431 | A * | 5/1996 | Shimomura | B29C 65/02 156/244.11 |
| 5,543,194 | A * | 8/1996 | Rudy | A43B 13/189 36/29 |
| 5,572,804 | A * | 11/1996 | Skaja | A43B 13/181 36/28 |
| 5,993,585 | A * | 11/1999 | Goodwin | A43B 7/144 156/145 |
| 6,178,663 | B1 * | 1/2001 | Schoesler | A43B 17/026 36/29 |
| 7,622,014 | B2 * | 11/2009 | Millette | A43B 13/203 156/267 |
| 8,241,451 | B2 * | 8/2012 | Rapaport | A43B 1/04 12/146 R |
| 8,572,786 | B2 * | 11/2013 | Davis | A43B 23/029 12/142 R |
| 2001/0045028 | A1 * | 11/2001 | Crane | A43B 7/1415 36/44 |
| 2002/0066209 | A1 * | 6/2002 | Steed | A43B 13/24 36/44 |
| 2003/0098118 | A1 * | 5/2003 | Rapaport | A43B 13/20 156/221 |
| 2004/0151927 | A1 | 8/2004 | Gauthier et al. | |
| 2007/0000605 | A1 | 1/2007 | Millette et al. | |

* cited by examiner

INFLATABLE BLADDERS FOR USE IN FOOTWEAR AND OTHER ARTICLES OF MANUFACTURE

CROSS-REFERENCE TO RELATED APPLICATION

This application is a continuation of and claims priority to U.S. application Ser. No. 14/033,129, filed Sep. 20, 2013, which is a divisional of U.S. application Ser. No. 12/903,129, filed Oct. 12, 2010, now U.S. Pat. No. 8,572,286, the disclosures of which are incorporated herein in their entirety by reference thereto.

BACKGROUND OF THE INVENTION

Field of the Invention

The present invention relates to methods for manufacturing inflatable bladders and also to inflatable bladders and footwear and other articles of manufacture which include such inflatable bladders.

Background Art

Inflatable articles of manufacture or bladders for use in inflatable articles of manufacture have been known for decades. Such articles of manufacture include inflatable air mattresses and pillows, inflatable life preservers and rafts, and athletic equipment. In the field of athletic equipment, inflatable bladders have been incorporated in the interior of balls (e.g., basketballs, footballs, soccer balls, etc.), as well as in apparel and protective equipment such as baseball and boxing gloves, helmets, chest protectors and footwear. When utilized in footwear, an inflatable bladder may be used to provide customized cushioning to the wearer's foot and to enhance fit. In some instances, an inflatable bladder may take the place of a lacing system to secure the shoe to the foot of the wearer. Inflatable bladders may also be used in the sole of a shoe to provide cushioning to the bottom of the wearer's foot and to absorb impact forces from walking, running and jumping.

U.S. Pat. No. 7,278,445 discloses a Shoe Having an Inflatable Bladder, the disclosure of which is incorporated herein by reference in its entirety.

U.S. Pat. No. 5,113,599 to Cohen et al. (the '599 patent) discloses an athletic shoe having an inflatable bladder. This patent discloses a variety of inflatable bladder configurations for use in the tongue, on lateral and medial sides, around the ankles, beneath the foot, or in the entirety of the shoe. The bladder of the patent is formed from a first thermoplastic urethane (TPU) film and a co-extensive second TPU film. The first and second films are attached to each other along pre-defined weld or pattern lines. A peripheral weld line of the bladder creates a sealed bladder compartment or chamber and prevents air from escaping from the bladder. The first and second films are further attached to each other at a number of circular points or interior weld lines to control the thickness of the bladder to prevent undesired "bulging", which could cause discomfort to the wearer or inhibit proper fit.

The first and second films of the bladder of the '599 patent are welded together using radio frequency (RF) or dielectric welding. RF or dielectric welding uses high frequency radio energy to agitate the molecules of thermoplastic materials to a point where they melt and weld together to form a strong bond. To weld the bladder of the '599 patent, the coextensive films are placed between a brass die (having raised areas representing the desired peripheral, circular and interior weld lines) and a platten on an RF machine. After bringing the brass die and RF platten into contact with each other, the RF machine is activated and the first and second films are bonded to each other only at the raised areas on the brass die to form the peripheral, circular and interior weld lines. Upon completion of the welding step, the inflatable bladder is die-cut from the remainder of the coextensive first and second films and assembled into the shoe as appropriate by adhesives, conventional stitching or other fastening means. The first and second films of the '599 patent may also be adhered to each other by conventionally heated and appropriately patterned brass dies or by application of chemical adhesives or bonding agents suitable for use with thermoplastic films.

The patent further discloses inflation of the bladder by a pump permanently affixed to the bladder using the RF welding technique described above or any other sealing method appropriate for use with the films thereof. Alternatively, the bladder may be inflated by an off-board pump connectable to an inflation/deflation valve, also affixed to the bladder in a location easily accessed by the wearer. Other pumps and valves, suitable for use with inflatable bladders for footwear, are disclosed in U.S. Pat. Nos. 5,074,765 and 5,144,708.

While manufacture of an inflatable bladder using RF welding requires no adhesives or additional materials and has the advantages of precise patterning, decreased heat-degradation in areas of the film adjacent to weld lines and strength of seal, it is costly and time consuming to machine or chemically etch the brass dies for the inflatable bladder patterns, particularly where an article of manufacture is produced in a large range of sizes and in multiple configurations. Conventionally heated brass dies are also expensive to machine, while chemical adhesion is messy and requires cure time in controlled environments. Moreover, RF welding techniques are extremely sensitive, require that the films be sufficiently thick to prevent excessive melting of the film (which could cause a breach of the bladder), and often result in finished bladders that "curl" along their edges (which can complicate their assembly into articles of manufacture such as footwear).

Thus, it is desirable to provide a method for manufacturing inflatable bladders for use in footwear and other articles which is relatively inexpensive, time efficient and allows for the manufacture of a variety of bladder configurations and sizes, utilizing a process and materials resulting in little to no interruption or delay in the manufacturing process.

BRIEF SUMMARY OF THE INVENTION

The manufacturing method of the present invention is advantageous over those known in the art, in that it is simpler, can be semi-continuous or semi-automatic in nature, easily modified to permit manufacture of a variety of bladder configurations, and more economical by avoiding the need for expensive configuration-specific, brass-machined tooling. In one aspect of the present invention, a method for manufacturing an inflatable article comprises the steps of providing a first polymer film having an inner side and an outer side, applying a curable release coating to the inner side of the first polymer film in a pattern that corresponds to the configuration of an inflatable compartment of an inflatable bladder, curing the release coating to the inner side of the first polymer film by the application of ultra-violet light, providing a second polymer film having an inner side and an outer side with the first polymer film to form a layered element, such that the release coating is disposed between the inner side of the first polymer film and the inner side of the polymer film, positioning the layered element between a first ply of material and a second ply of material, applying heat and pressure to the first and second plies of material positioned about the layered element to adhere the first polymer film to the second polymer film except in the area where the release coating has been applied to the inner side of the first polymer film to form an inflatable compartment surrounded by a sealed perimeter, and removing the first and second plies of material from the adhered first and second polymer films. The curable release coating may be silicone fortified. The curable release coating may be applied to the inner side of the first polymer film by screen printing. The first and second plies of material may be polytetrafluoroethylene-coated, fiberglass-reinforced cloths. At least one of the first and second plies of material may be textured. The applying heat and pressure step may be accomplished by rotary lamination. The method may further comprise the step of cutting along the sealed perimeter to form an inflatable bladder having a sealed attachment margin and incorporating the inflatable bladder into an article of footwear by attaching the inflatable bladder to the article of footwear at the attachment margin. The method may further comprise the step of coupling an inflation device and a deflation device to the inflatable bladder. One of the first or second polymer films may be a laminate comprised of a polymer layer and a substrate.

In another aspect of the present invention, a method for manufacturing an inflatable bladder comprises the steps positioning a barrier material between a first film and a second film in a configuration that corresponds to the shape of an inflatable compartment of the inflatable bladder, positioning the first and second films with the barrier material positioned thereinbetween between a first ply of material and a second ply of material, adhering the first film to the second film except in the vicinity of the barrier material to form the inflatable bladder having the inflatable compartment surrounded by a sealed, continuously substantially flat perimeter, and removing the first and second plies of material from the inflatable bladder. The method may further comprise the step of incorporating the inflatable bladder into an article of footwear by securing the inflatable bladder to the article of footwear at the perimeter of the inflatable bladder. The barrier material may be a paint, ink, paper, textile, photosensitive agent, wire, foil, or particulate. The barrier material may be a curable release coating, and the step of positioning the barrier material between the first film and the second film may include the substep of applying the release coating to the first film, curing the release coating to the first film, and sandwiching the cured release coating between the first and second films. The release coating may be applied to the first film using a screen, template, or stencil. The release coating may be cured by the application of ultra violet light. The first and second plies of material may be polytetrafluoroethylene-coated, fiberglass-reinforced cloths. At least one of the first and second plies may be textured. The adhering step may be accomplished by rotary lamination, by heated pressing between platens, or by application of vacuum and heat. The method may further comprise the step of coupling an inflation device and a deflation device to the inflatable bladder. At least one of the first or second films may be a laminate comprised of a polymer layer and a substrate. The barrier material may include at least two release coatings. Where two release coatings are provided, the step of positioning the barrier material between the first film and the second film may include the substep of applying a first release coating to the first film, applying a second release coating to the second film, curing at least one of the release coatings, and sandwiching the release coatings between the first and second films. The release coating applied to the second film may be a discontinuous coating.

In yet another aspect of the invention, an inflatable article of footwear comprises a sole and an upper having an inflatable bladder attached to the sole. The inflatable bladder comprises a first film, a release agent applied and cured to the first film in a pattern that corresponds to the shape of an inflatable compartment of the inflatable bladder, a second film adhered to the first film such that said release agent is disposed between the first film and the second film and the first film and the second film do not adhere to each other in the vicinity of the release agent thereby forming the inflatable compartment with a peripheral edge, whereby the inflatable bladder is devoid of raised weld lines or raised adhering seams and wherein at least a portion of the exterior surface of the inflatable bladder is textured. Substantially all of the exterior surface of the inflatable bladder may be textured. The textured exterior surface of the inflatable bladder may correspond to the texture of a ply of textured material that was positioned adjacent to the exterior surface of at least one of the first film or the second film while the first and second films were adhered to each other. The ply of material may be polytetrafluoroethylene, fiberglass-reinforced cloth. The inflatable bladder may include a substantially flat, adhered attachment margin extending from the peripheral edge of the inflatable compartment to an edge of the inflatable bladder to facilitate attachment of the inflatable bladder to the upper of the article of footwear. The cured release agent may be silicone fortified and cured by the application of ultra violet light. At least one of the films may be a polymer bonded to a substrate. The article of footwear may comprise an inflation device and a deflation device.

In still another embodiment, an inflatable article of footwear comprises an upper, a sole attached to the upper, and an inflatable bladder attached to the article of footwear. The inflatable bladder comprises a first single-layered film having an inner surface and a textured outer surface, a release agent applied and cured to the inner surface of the first single-layered film in a pattern that corresponds to the shape of an inflatable compartment of the inflatable bladder, a second single-layered film having an inner surface and a textured outer surface disposed in facing relationship with and adhered to the first single-layered film such that the release agent is disposed between the inner surface of the first single-layered film and the inner surface of the second single-layered film, the release agent preventing the first single-layered film from adhering to the second single-layered film in the area where the release agent is applied to form the inflatable compartment of the inflatable bladder. The texture of the outer surfaces of the first and second single-layered films may be imparted thereto by a woven material disposed adjacent to the outer surfaces of the first and second single-layered films during adherence of the first single-layered film to the second single-layered film.

BRIEF DESCRIPTION OF THE DRAWINGS/FIGURES

The accompanying drawings, which are incorporated herein and form a part of the specification, illustrate the present invention and, together with the description, further serve to explain the principles of the present invention and to enable a person skilled in the relevant art to practice the same.

DETAILED DESCRIPTION OF THE INVENTION

It is desirable for inflatable articles of manufacture or bladders to be durable, as well as quick, easy and inexpensive to manufacture. The present invention seeks to reduce the cost and time typically associated with the manufacture of inflatable articles or bladders for use in inflatable articles of manufacture, by simplifying the manufacturing process and avoiding the need for brass tooling, which can be expensive and time-consuming to machine or form, as well as to change-out, to permit the manufacture of inflatable articles or bladders having numerous sizes and configurations.

While conventional bladder manufacturing methods rely on tooling specific to the configuration of the bladder to weld or seal two or more films together to form inflatable areas or compartments, the method of the present invention employs a barrier material (also referred to herein as a release coating or agent) applied to one of the films (or both of the films), in accordance with a pre-defined or customized pattern, to prevent the films from adhering together to create inflatable areas or compartments, when heat and/or pressure are applied thereto. The barrier material can be easily applied to either of the films, in various configurations, to permit manufacture of an inflatable article or bladder inexpensively, quickly, essentially continuously and with a high degree of manufacturing flexibility.

Figure 1:
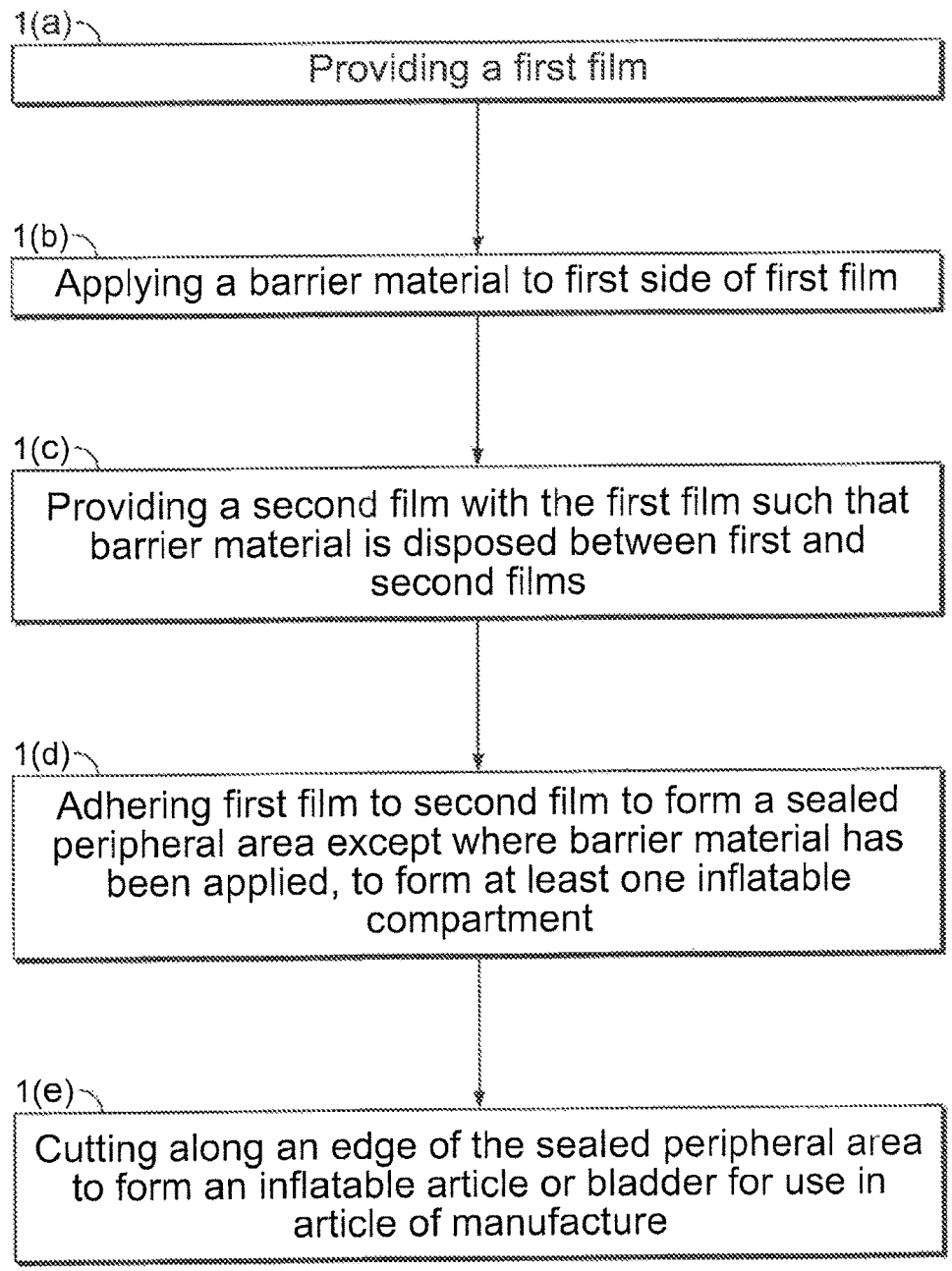
FIG. 1 is a depiction of the steps of the method of the present invention for manufacturing inflatable articles or bladders for use in inflatable articles.

As shown in FIG. 1, a method of the present invention generally comprises the steps of 1(a) providing a first film, which for most applications will be impervious to the fluid used to inflate the bladder or inflatable article of manufacture, 1(b) applying a barrier material to a first side of the first film, 1(c) providing a second film with the first film such that the barrier material is disposed between the first film and the second film, 1(d) adhering the first film to the second film to form a sealed peripheral area, except in the area where the barrier material has been applied, to form at least one inflatable compartment, and, optionally, 1(e) cutting along the sealed peripheral area to form an inflatable article or inflatable bladder having a sealed peripheral edge for use in an article of manufacture. It is also envisioned that the barrier material could be applied to the second film or to the facing sides of both films. Alternatively, the barrier material could take the form of a separate material (or third film) simply positioned between the first and second films.

Turning now to the steps of the method of FIG. 1, first and second films may be identical or different materials provided that they are each made from a material that may be adhered together to form a fluid-tight seal. Films can be formed from a variety of polymers such as thermoplastic resins, other elastomeric materials, thermoset materials, and composites thereof, including but not limited to, thermoplastic polyurethane (TPU), ethylenevinylacetate/polyethylene copolymer, polyester elastomer (e.g. Hytrel® material available from DuPont), polyethylene, polypropylene, neoprene, natural rubber, dacron/polyester, polyvinylchloride, thermoplastic rubbers, nitrile rubber, butyl rubber, sulfide rubber, methyl rubber, silicone rubber, polyvinyl acetate, Buna-N, Buna-S, polystyrene, ethylene propylene, polybutadiene, chlorfulfonated polythylene, nylon, partially set thermoset materials, ethylene vinyl acetate (EVA) foam, thermoset rubber, prepreg and others. One particular example of a suitable class of TPU film for the method of the present invention is a polyester urethane film available from JP Stevens under product no. ST1880. This film class has a Shore A hardness of 88-92 and a formulation having a base resin of Pellethane® (available from Dow Chemical), Estane® (available from Noveon) or Elastollan® (available from BASF). One skilled in the art can appreciate that any number of thermoplastic, elastomeric, and thermoset materials are suitable for use in the present invention, provided such materials are flexible and capable of forming a fluid-tight seal with another material having the same characteristics. It is further envisioned that sheet films employed in the food packaging arts, and other materials such as polyester or biaxially-oriented polyethylene terephthalate (e.g., Mylar® film), could take advantage of the manufacturing method of the present invention.

Moreover, while the method of FIG. 1 has been described as providing a first and second "film", such film need not be a single ply of material. Indeed, either or both of the first and second films may be a laminate of a thermoplastic layer and a substrate applied to only one side of the polymer layer (permitting the opposite side of the polymer layer to be sealed to the second film (or laminate)). Substrates may be any of a variety of textiles, for example, any synthetic or natural fiber or fabric. One non-limiting example of a fabric used as a laminate of an inflatable bladder for footwear is a non-woven, high-density 70% nylon and 30% polyester blend, available from Dae Woo International Corporation (Pusan, Korea). Several methods have been developed to form laminates between polymer layers and substrates. One such method includes direct cast extrusion of a thermoplastic resin onto a substrate to form a thin layer thereon. Provided that the substrate is at least partially porous, the polymer resin will penetrate the pores of the substrate and bond thereto. Other laminate forming methods known to those skilled in the art would also be suitable for forming a laminate for use as the films of the present invention. For example, a laminate may be formed from a polymer layer and a substrate by adhering the polymer layer to the substrate by application of heat and pressure, an adhesive or bonding agent, or by ultrasonic bonding. Further, the laminate may include more than one polymer layer, as well as more than one layer of substrate, provided that at least one polymer layer is able to be sealed to another polymer layer, to form at least one compartment of the inflatable bladder.

Figure 11:
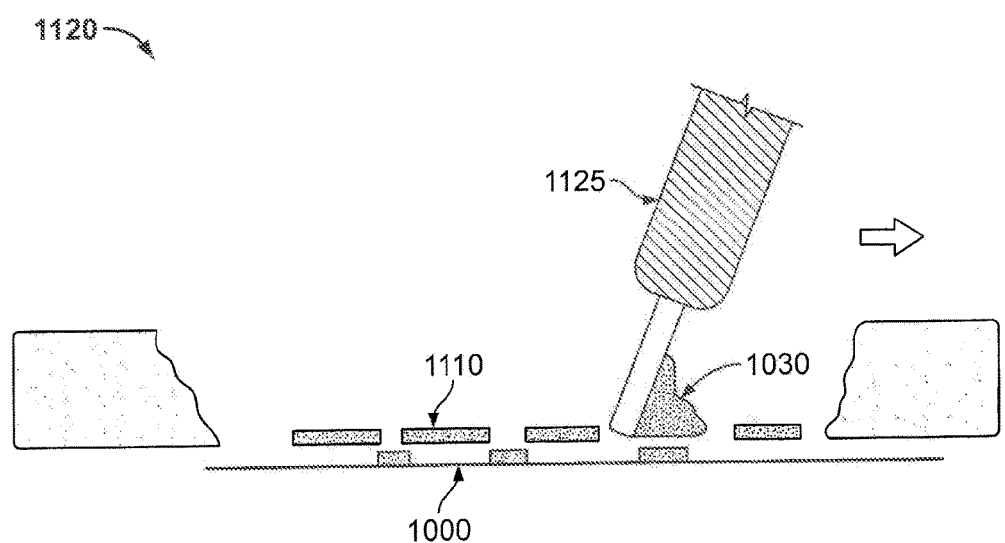
FIG. 11 is a plan view of a basic screen printing process.

Turning now to Step 1(b) of the method set forth in FIG. 1, a barrier material is applied to a first side of the first film. The barrier material may be any material or treatment that prevents the first film from adhering to the second film of the invention upon application of heat and/or pressure. More particularly, the barrier material may be a paint, ink, polytetrafluoroethylene (PTFE) (e.g., TEFLON®) coating, silicone coating, paper, textile, photosensitive agent, foil, wire, particulate or surface treatment that maintains the integrity of the first and second films, but still prevents the films from adhering to each other where the barrier material or treatment has been applied.

Where the barrier material is a paint, for example, the paint could be applied to the first film in accordance with Step 1(b) of the method in a manner similar to silk-screening. Silk-screening (or screen printing) is a long-used process for economically mass producing signage, prints and fabric designs, etc. The basic idea in silk-screening (as generally shown in FIG. 11) is to create a master screen through which paint (or other suitable media) passes to impart a design or imprint on a large number of duplicates. Generally, a drawing or tracing of a design is transferred by means of a photo process to a thin, fine grain photo sensitive gel coated cloth (or "silk"), which is tightly stretched over a frame. When the gel is exposed, the part of the gel that is exposed to light hardens or cures, while the unexposed part remains soft. After curing, the soft gel is washed away, leaving a "negative" image of the design on the silk. The silk is open-celled (like a screen), so that the paint or other media can pass therethrough.

The framed silk is placed against the object upon which the design is to be imparted. Paint is then applied thereto and pulled across the silk with a squeegee or similar device to transfer the design through the silk to the object below. Where a design having multiple colors is desired, a separate screen must be prepared for each color (similar to the color separation process in conventional ink-printing methods). With the silk-screening method, thousands of "prints" can be made from a single silk. More recently, the printing screens are formed from monofilament materials such as polyester, rather than silk.

Figure 2:
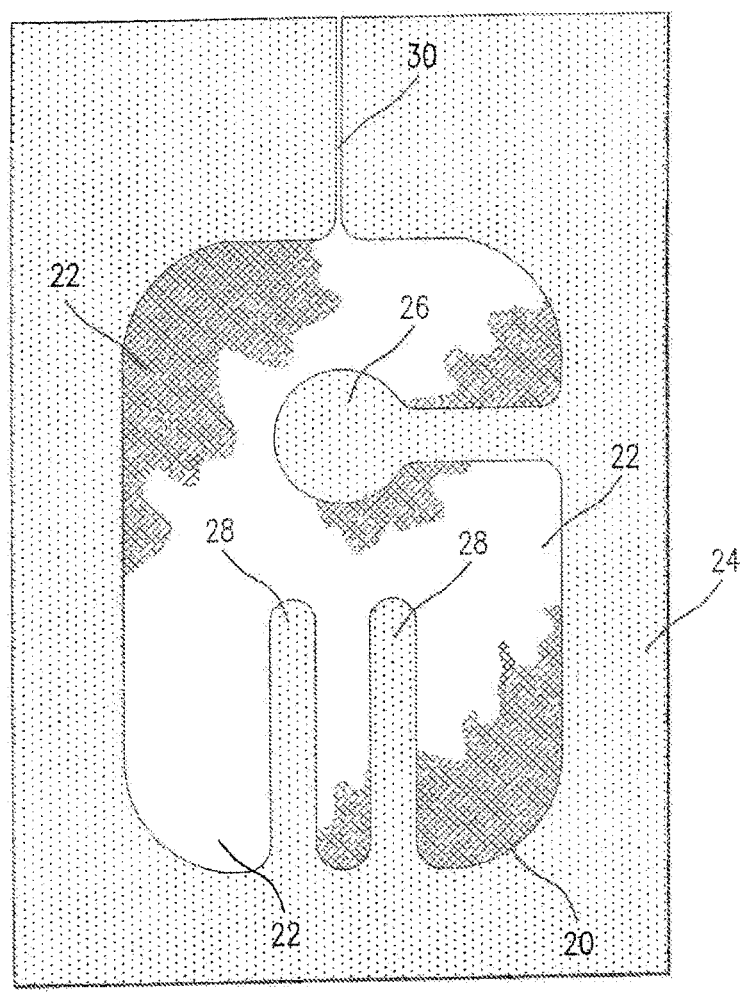
FIG. 2 is a negative image of an inflatable bladder design or configuration as formed on a printing screen.

By applying the silk-screening technique described above to the method of the present invention, a variety of bladder configurations and sizes can be "printed" on or imparted to the first film of Step 1(a) to function as the barrier material of the present invention. For example, FIG. 2 illustrates a negative image of an inflatable bladder design or configuration 20 as formed on a printing silk or screen 24. Where the screen or silk is visible in area 22 is where the paint, ink of other media will be transferred through the screen and onto the first film of Step 1(a). Bladder design or configuration 20 comprises a circular element 26 and linear elements 28, which prevent transfer of the paint, ink or other media onto the first film. When the first and second films are adhered together (in Step 1(d) of the method discussed below), the first and second films will adhere to each other at circular element 26 and linear elements 28 to form the equivalent of the circular welds and weld lines of the prior art described above, to control the thickness and inflation of the bladder and, with respect to apparel or footwear, to accommodate the anatomy of the human body. Negative image 20 of the inflatable bladder design or configuration also includes a visible area of screen 30, which extends from the edge of the screen into area 22. Area 30 is conduit-like in shape and is intended to form a passage for receiving an inlet or outlet valve or other fitting to permit fluid to be introduced into and/or released from the inflatable article or bladder of the invention. While area 30 is shown as being conduit-shaped in FIG. 2, it should be understood by those in the art that area 30 may take any shape necessary to accommodate the fittings needed to inflate or deflate the inflatable article of manufacture or bladder.

It should also be realized by those skilled in the relevant art that while a particular negative bladder design or configuration has been illustrated in FIG. 2, the negative design of the bladder (and thus, the bladder ultimately formed by the method of the present invention) may take any shape required for the intended purpose or function of the inflatable article or bladder. For example, when used in footwear, the bladder may be configured to fit within the tongue of the shoe, along the medial and lateral sides, around the ankles and under the arch, heel or metatarsal heads. Similarly, the bladder may be designed to fit within the shell of a life preserver, chest protector, helmet, gloves, air mattress, packaging, or any other inflatable article of manufacture.

Likewise, the described linear and circular elements may be placed in any position to accommodate the function of the bladder and to control inflation and/or bulging of the bladder, as necessary. In addition, the linear and/or circular elements need not be linear or circular, but may be elongated, curved or of any geometry to meet the functional objectives of the bladder or the anatomy of the user, where the bladder is to be incorporated into an article of manufacture to be worn by a human.

Figure 3:
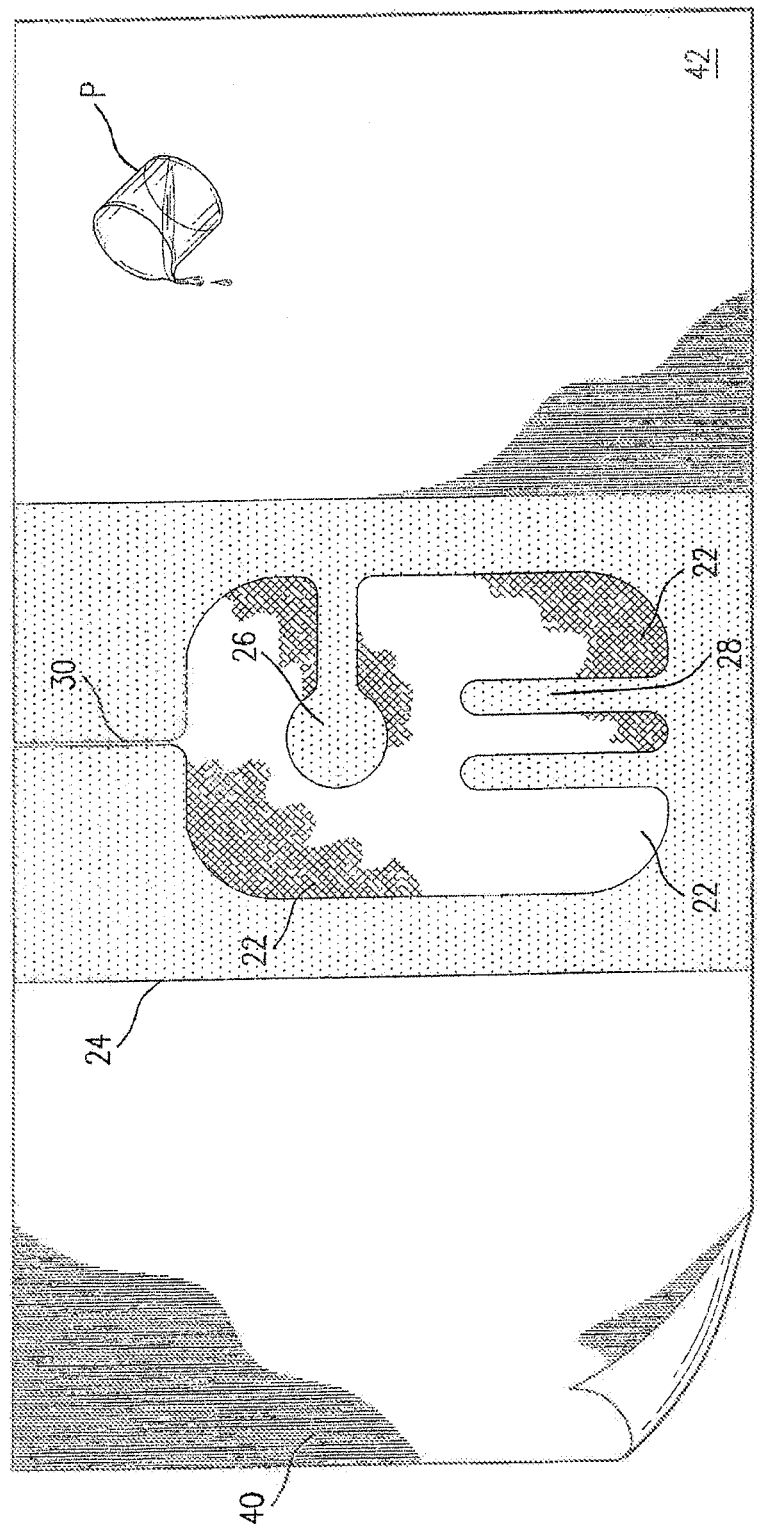
FIG. 3 is a depiction of the step of applying a barrier material to a first film of the method using the printing screen of FIG. 2.

Continuing with the steps of the method of FIG. 1, after creating a screen 24 with a negative image of the desired inflatable bladder design or configuration 20, screen 24 is placed on top of a first side 40 of first film 42, as shown in FIG. 3. A paint, ink or other media P is then applied to and pulled across screen 24 to transfer the configuration or design of the inflatable bladder onto first side 40 of first film

42, as visible area 22. Thus, by transferring the image of the inflatable bladder configuration onto the first side of the first film with paint, ink or other media, a barrier material is applied to the first side of the first film as required by Step 1(*b*) of the method of the present invention.

Figure 4:
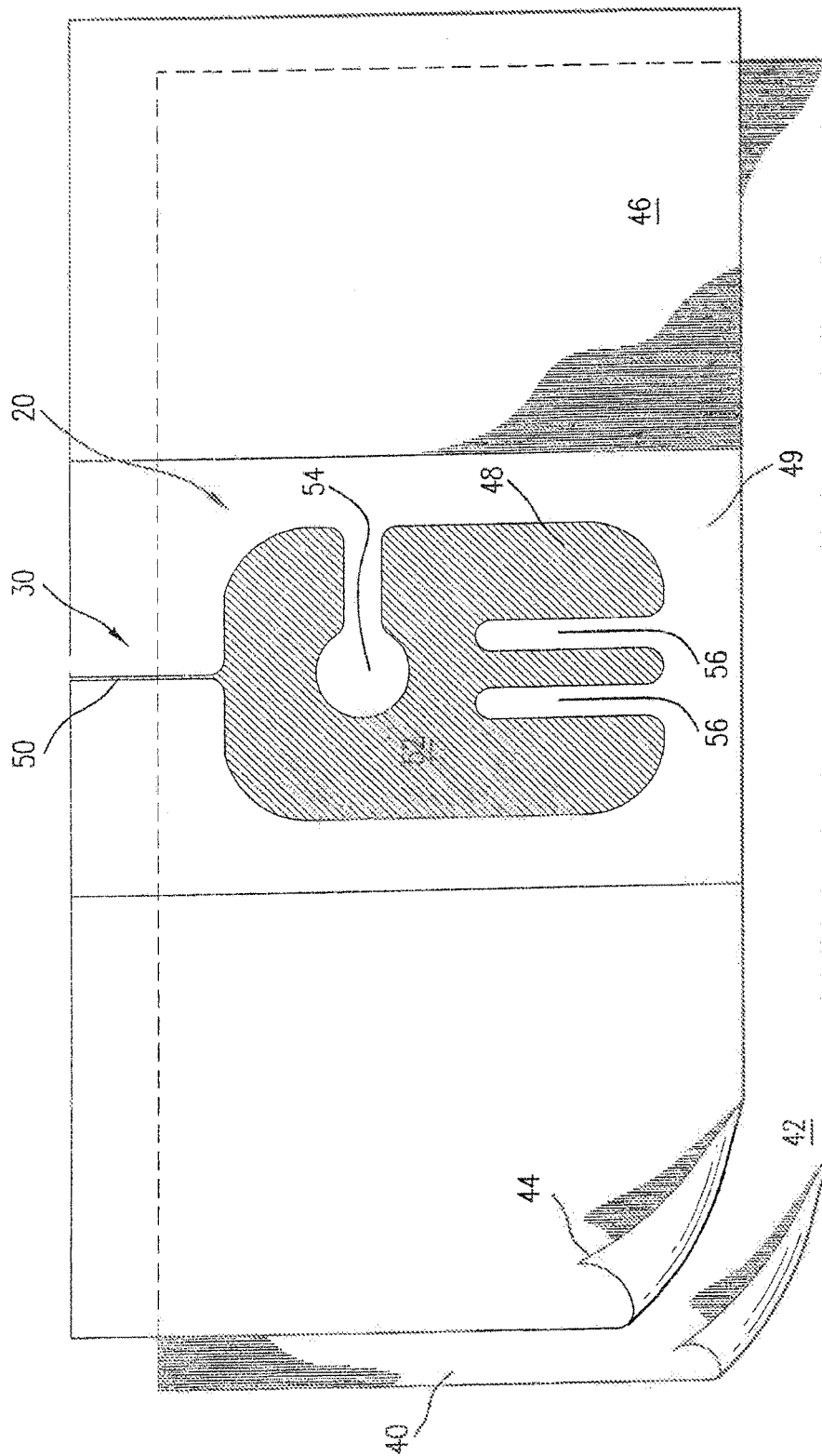
FIG. 4 is a depiction of the transferred barrier material positioned between the first and second films of the method.

FIG. 4 illustrates Step 1(*c*) of the method of FIG. 1. In this step, a first side 44 of a second film 46 is positioned over first side 40 of first film 42, such that the barrier material image 48 of the inflatable bladder configuration 20 and the barrier material image 50 of the conduit 30 is positioned between first film 42 and second film 46. In FIG. 4, the barrier material is visible through second film 46.

In Step 1(*d*) of the method of FIG. 1, first film 42 is adhered to second film 46 so that the films are sealed together to form a sealed peripheral area except where the barrier material has been applied to the first film, to form at least one inflatable compartment. Where the barrier material has been applied to the first film, no adherence will occur to create the inflatable compartment of the resulting inflatable article or bladder. In FIG. 4, the sealed area is shown in hatched area 49, while the at least one inflatable compartment is shown at 52. Upon sealing, circular element 26 and linear elements 28 form circular and linear seals or welds 54, 56.

The first and second films may be adhered by a heated platten brought into contact with the films, or the coextensive films could be fed together through heated rollers commonly known in the laminating art, for example. Other known means for sealing or laminating thermoplastic films (e.g., ultrasonic welding) could also be employed to achieve the objects of the present invention. The films could also be made photosensitive so that they would adhere to one another upon application of light.

Figure 5:
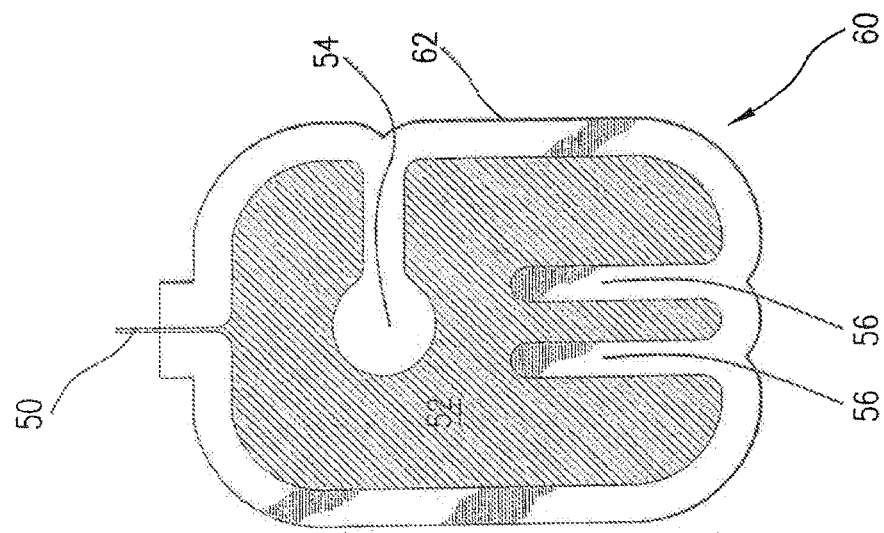
FIG. 5 is a depiction of the first and second films of the method as sealed together.
Figure 6:
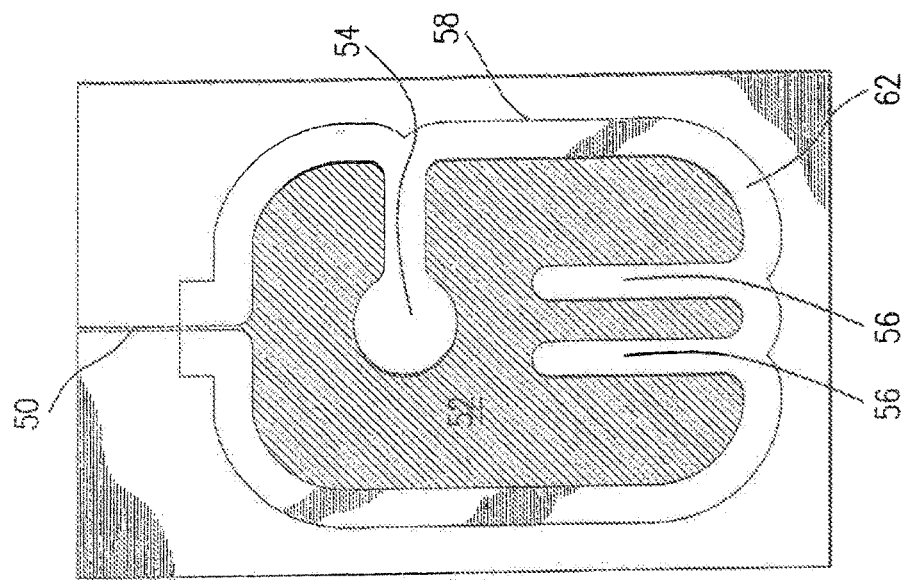
FIG. 6 is a depiction of an inflatable article or bladder made in accordance with the method of the present invention.

In Step 1(*e*) of the method of FIG. 1, and as shown in FIG. 5, a cut is made along the edge of the sealed peripheral area near the inflatable compartment at cut line 58 to form an inflatable article or bladder 60 having at least one inflatable compartment 52, a circular weld 54, linear welds 56, a deflation/inflation conduit 50 and a peripheral edge 62 (see FIG. 6). This cut can be made by a cutting die configured in accordance with the pre-defined or customized bladder configuration (but slightly larger) or by other suitable cutting means such as laser cutting or water jet cutting.

Inflatable bladder 60 of FIG. 6 may be secured to or within an article of manufacture, for example, an article of footwear, by securing the bladder to the shoe components along peripheral edge 62 by stitching, an adhesive or other suitable fastening means.

Thus, as described above, this embodiment of the method of the present invention enables an inflatable article or bladder for an inflatable article, to be manufactured quickly, easily and without the use of expensive article or bladder configuration-specific, metal tooling. Indeed, the method can be utilized with known silk-screening or printing and laminating techniques to allow for the continuous manufacture of multiple-shaped inflatable articles or bladders at relatively low cost. Moreover, and most advantageously, when a bladder configuration change is required, there is no need to order, machine and replace an expensive piece of metal tooling in the manufacturing process. Instead, a new screen/negative image of the newly desired bladder configuration is made and exchanged for the prior screen/negative image—a simple, quick and inexpensive process, which is also compatible with the down-stream steps of the manufacturing process (i.e., adhering and cutting). Alternatively, a new screen/negative image could be digitally fed to the manufacturing process.

Returning to a discussion of Step 1(*b*) of the method of FIG. 1, the silk-screening technique described above is particularly advantageous for the manufacture of inflatable articles or bladders for consumer products in that silk-screening allows for the use of multiple colors to create bladders having visually appealing, colored designs or cosmetics. It is also envisioned that multiple colors could be used with appropriately designed screens to transfer an image of a product trademark, brand or logo onto the films and, thus, the inflatable article or bladder.

While the barrier material and application step of the present invention has been described above with respect to paint or ink as used with a silk-screening or printing technique, it is envisioned that the barrier material may take other forms. For example, the barrier material may be a paper (e.g., adhesive-backed paper), fabric, foil, wire, particulate, or plastic material (such as polyethylene) applied to the first side of the first film to prevent the first and second films from adhering together to form at least one inflatable chamber.

It is also possible that the barrier material may be "free-floating" and not attached to either the first or second film. Indeed, the barrier material could be a particular type of film (or films) positioned between the first and second films that would not bond to the first and second films (e.g., the film would release from the first and second films as they cool, following the application of heat). Other "free-floating" barrier materials can include, for example, paper, fabric, foil, wire, particulate, or plastic material positioned between the first and second films. Alternatively, the barrier material may be temporarily applied to one of the first or second films.

In another embodiment, the barrier material could be a particulate, soap, surfactant, release coating or agent, or a polytetrafluoroethylene or silicone coating, sprayed over an appropriately shaped stencil to transfer the barrier material, in the desired article or bladder configuration, onto a first side of the first film to prevent the first and second films from adhering to each other during the sealing step of the invention.

In yet another embodiment of the invention, and utilizing the silk-screening or printing technique described above, the barrier material could also be an acid or other liquid chemical, which is transferred to a first side of the first film to chemically etch, corrode or abrade the first film, to inhibit attachment of the first film to the second. It is also envisioned that a photosensitive material could be transferred to the first film and subsequently exposed to light to meet the objectives of the barrier material of the invention.

In still another embodiment, the first film could be calendared between a hot roller and another hot or cold roller to apply or emboss a texture (having the overall desired bladder configuration) on one side of the first film to prevent it from adhering to the second film to form an inflatable compartment.

It is also envisioned that the method of present invention is capable of applying printing techniques (that is, printing films and rollers) used by the newspaper or printing industry to transfer a variety of inflatable article or bladder shapes onto a first film for adhering to a second film to form an inflatable compartment.

Figure 7:
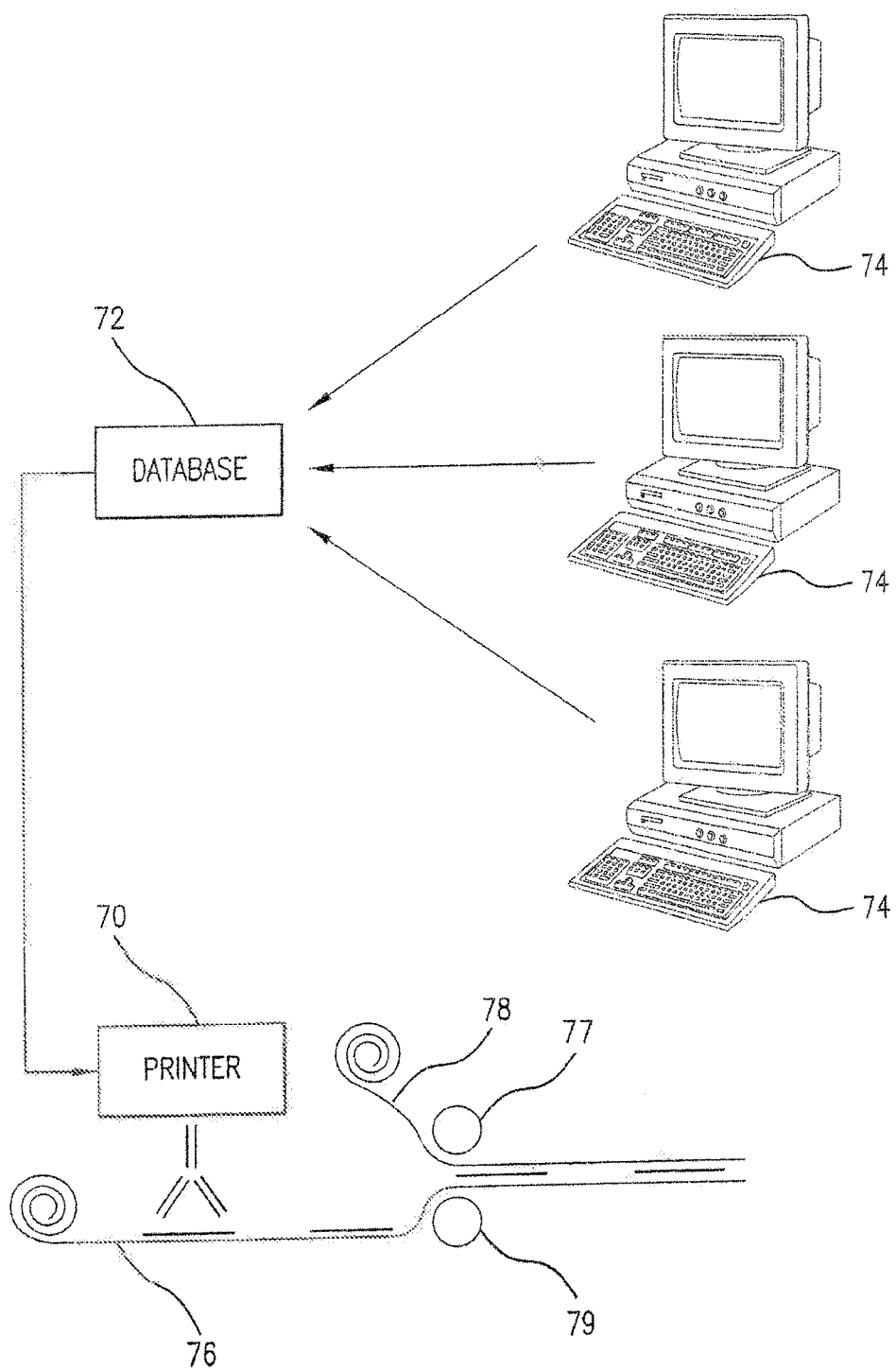
FIG. 7 is a depiction of an alternate embodiment of the step for applying a barrier material to a first film.

In another aspect of the invention, and with reference to FIG. 7, the above-described embodiments of the invention can be utilized in conjunction with "on-demand" printing technology to create customized inflatable products. Specifically, Step 1(*b*) of applying a barrier material to the first film could be accomplished by printing the barrier material on the film (possibly using the techniques described above)

with a "smart" digital printer 70, which has access to a database 72 of customized information to create unique designs having customized bladder configurations, customized placement of circular and linear elements, and customized colors.

In practice, a customer for a shoe, for example, might enter into a computer 74 a specific color or design that the customer wants to appear on the shoe. The design could be indicia such as a name, words, or symbols or could be a photograph of a person or place. It is also envisioned that an anatomical scan of the customer's foot could be entered (e.g., at a point-of-purchase kiosk or display) in order to enable customized manufacture of an inflatable article or bladder, which accommodates the anatomy of the customer's foot to enhance fit, cushioning and support. The entered information would then be transmitted to database 72 to which printer 70 has access. The printer would then access the database and print the unique design on a first film 76. First film 76 could be configured as a rolled sheet material, which is then joined with a similarly rolled second film 78. First film 76 and second film 78 would then be calendared through heated rollers 77, 79 to adhere the films together and create the inflatable compartment of the bladder. The bladder would then be cut from the films using the methods described above. Where the bladder is cut from the films using a laser, the laser could also be made "smart" by connecting the laser to the database to control cutting of the bladder from the films, in accordance with the customized bladder design printed on the film. The present invention also contemplates that the bladder could be "cut" from the films by providing a cutting die with a chemical that corrodes, dissolves or "eats" through the films.

This method of the present invention is not only customizable, but is continuous in nature, in that there is no need to interrupt the steps of the method to change-out for bladder designs of differing configurations, colors or indicia. When the bladder is built into a shoe, the bladder may form an exoskeleton of the shoe as described in U.S. Pat. No. 5,343,638. Because the bladder has a design printed on the inside of the film, the design may be made visible on the outside of the shoe to form a unique customized shoe.

Similarly, the barrier material could take the form of a thermally reflective material to provide the bladder with insulating properties. The bladder could then be constructed into apparel, for example, to form an insulating shirt, jacket, vest, pant, or other article of apparel.

It is further envisioned that the barrier material could be a printed background design (for example, an underwater scene), and that the bladder could be filed with a fluid and ornamental elements (for example, plastic fish and sparkles), for use in children's wear or other articles of manufacture directed to a specific type of consumer.

It is also contemplated that the bladder could be formed from more than two films, to create a bladder having multiple layered inflatable compartments. In this embodiment, specific barrier materials and films could be selected so that each layered, inflatable compartment of the bladder has a different inflation quality or characteristic to address the objectives of the inflatable article of manufacture.

As noted above, the inflatable bladder formed by the method of the present invention also comprises a conduit 50 for coupling with an inflation valve or a deflation valve. While this conduit serves as one means or structure for joining inflation and deflation fitments to the inflatable article or bladder per se, it is also envisioned that fitments known in the fluid transfer and control art could be attached to the article via an opening pre-formed in the second film prior to Step 1(*c*) of the method of FIG. 1. It is also envisioned that materials known in the art for constructing one-way valves and other structure useful in the art of inflatable technology could be inserted between the first and second films to permit and control the ingress and egress of fluid from the inflatable compartment.

Figure 8A:
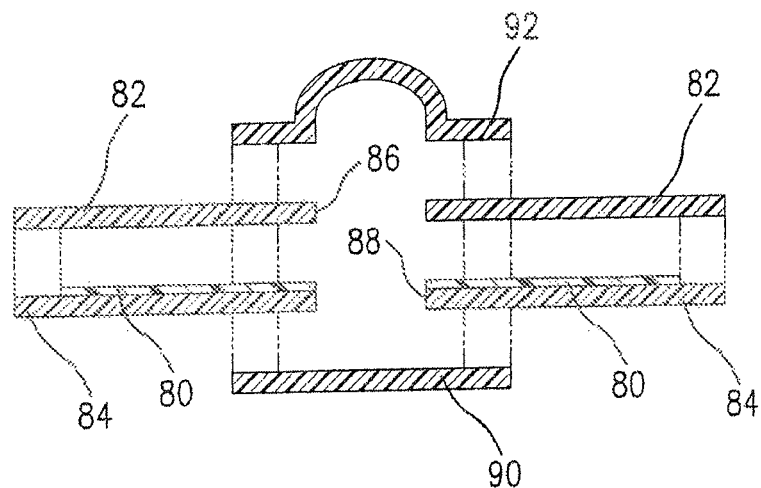
FIG. 8A is an exploded depiction of how to provide a fitment.
Figure 8B:
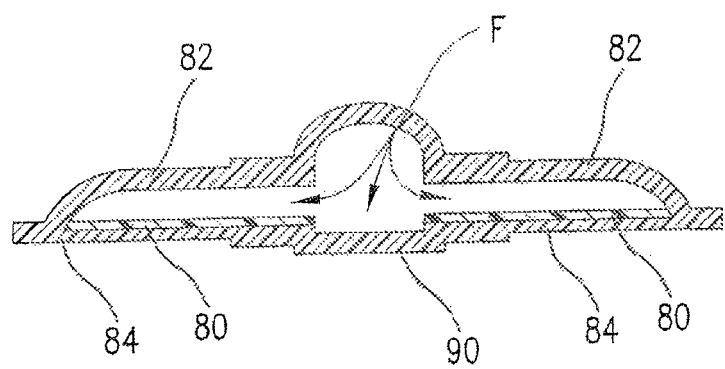
FIG. 8B is a depiction of the fitment as adhered to first and second films.

FIG. 8 illustrates how a conventional fitment may be constructed into bladder 60 during the manufacturing process of the present invention. FIG. 8A shows the manufacturing process of the method of FIG. 1 after completion of Step 1(*c*), but before Step 1(*d*). As shown in FIG. 8A, a barrier material 80 is positioned between a first film 82 and a second film 84. First film 82 and second film 84 are both provided with an opening 86,88 suitably positioned for placement of a pump, inlet valve, release valve, or other known fitment for an inflatable bladder. A washer 90 constructed of a film material having properties similar or identical to second film 84 is positioned over opening 88. A fitment, for example, a digitally operated pump 92 constructed of a material having properties similar or identical to first film 82, is positioned over opening 86. Step 4 of the present invention is then performed to adhere first film 82 to second film 84 in all areas except where barrier material 80 has been applied to second film 84. Washer 90 can then be adhered to second film 84 and pump 92 to first film 82. Elements 82 and 84, 90 and 84, and 92 and 82 are adhered to one another in the areas noted by dashed lines (where barrier material 80 is absent). After these steps, and as shown in FIG. 8B, the pump is adhered to the first film and the washer is adhered to the second film in an area of the bladder where an inflatable compartment or fluid conduit has been formed. Thus, fluid (illustrated by arrow F) is brought into the bladder, via the pump, to inflate the inflatable chamber defined by the area of application of the barrier material.

While a pump for bringing fluid into the bladder has been illustrated in FIG. 8, it should be noted that other fitments (for example, fluid release valves, fluid inlets, fluid regulators and check valves) may be attached to the films using the same technique. Further, it should be understood by those skilled in the art that other known techniques for securing fitments to inflatable bladders may be used with the method of the present invention.

Figure 9:
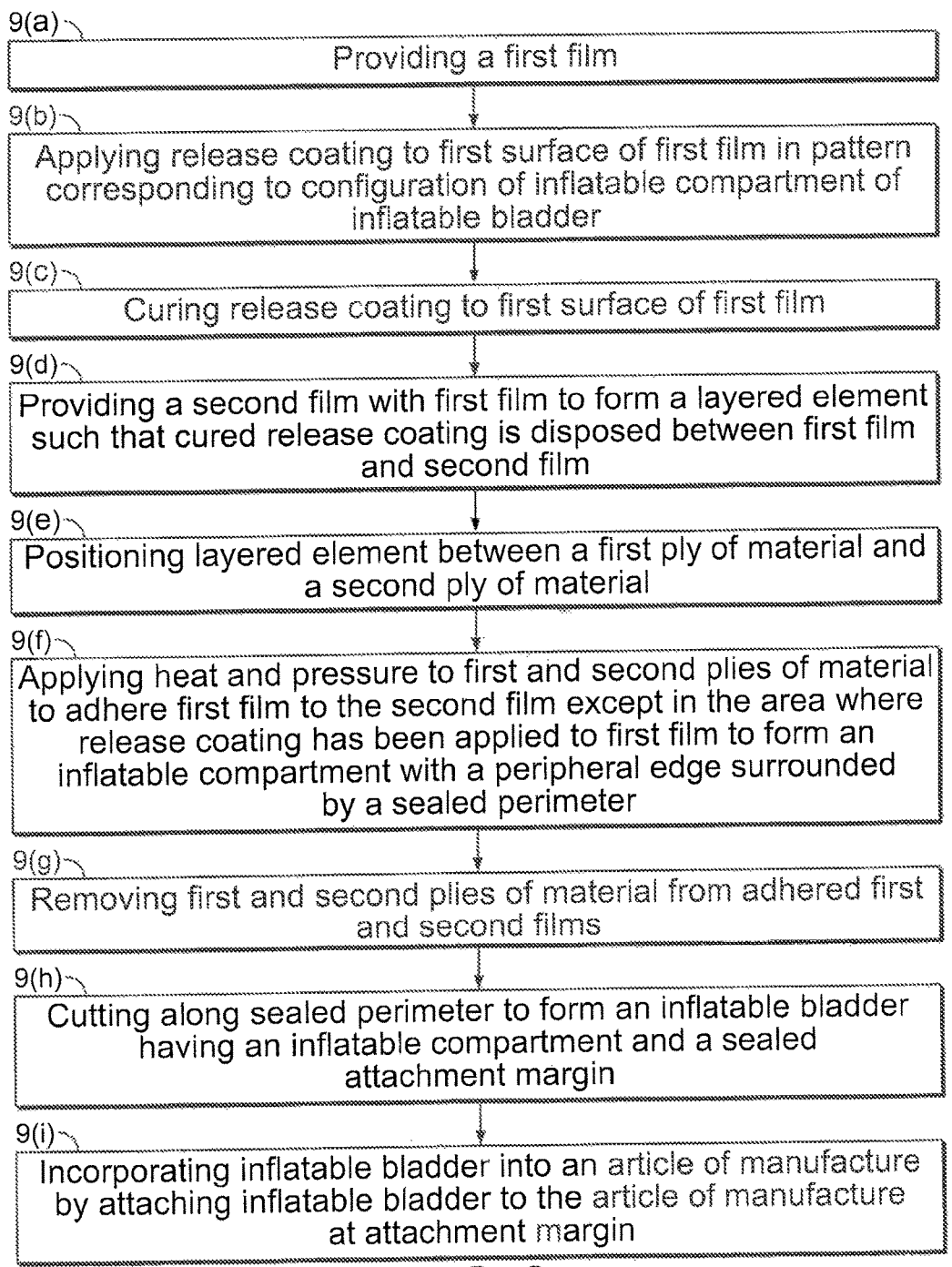
FIG. 9 illustrates the steps of a method according to an embodiment of the present invention for manufacturing inflatable bladders for use in footwear and other articles of manufacture.

FIG. 9 illustrates another method for manufacturing an inflatable article of manufacture, for example, an inflatable article of footwear. In one embodiment, the method generally comprises the steps of: 9(*a*) providing a first film, 9(*b*) applying a release coating to a first surface of the first film in a pattern corresponding to the configuration of an inflatable compartment of an bladder, 9(*c*) curing the release coating to the first surface of the first film, 9(*d*) providing a second film with the first film to form a layered element such that the cured release coating is disposed between the first film and the second film, 9(*e*) positioning the layered element between a first ply of material and a second ply of material, 9(*f*) applying heat and pressure to the first and second plies of material to adhere the first film to the second film except in the area where the release coating has been applied to the first film, to form an inflatable compartment surrounded by a sealed perimeter, 9(*g*) removing the first and second plies of material from the adhered first and second films, 9(*h*) cutting along the sealed perimeter to form an inflatable bladder having an inflatable compartment and a sealed attachment margin, and 9(*i*) incorporating the inflatable bladder into an article of manufacture by attaching the inflatable bladder to the article of manufacture at the attachment margin.

Turning now to a more detailed discussion of the method according to one embodiment, as shown in FIG. 9, a first film is provided in first step 9(a) of the method. The first film may be sized to accommodate the bladder or bladders to be manufactured therefrom and may be provided in individual sheet or roll form. First film may be a low density polyethylene film. In one particular embodiment, the first film is about 0.085 inch thick low density polyethylene film and is sold under product no. MC100V by Bloomer Plastics, Inc. (Bloomer, Wis.). In addition to this film, the films and materials identified in paragraph [0037] of this disclosure are suitable for the first film of the method of FIG. 9. Moreover, one skilled in the art will appreciate that any number of polymer materials are suitable for use in the method of FIG. 9, provided such materials are flexible and capable of forming a fluid-tight seal with another material having the same physical properties. Naturally, the characteristics of the film may also be modified as a function of the fluid to be used in the bladder. If, for example, the bladder is intended to be used to contain a liquid or a large molecular-weight gas, the bladder may allow diffusion or reverse diffusion into and out of the bag without diverging from the spirit of the invention. Similarly, the bladder may be purposefully made porous to allow fluid to diffuse or escape from the bladder when a predetermined internal pressure is reached. This may be done by adding perforations to the film or by using films with known diffusion rates.

Figure 10:
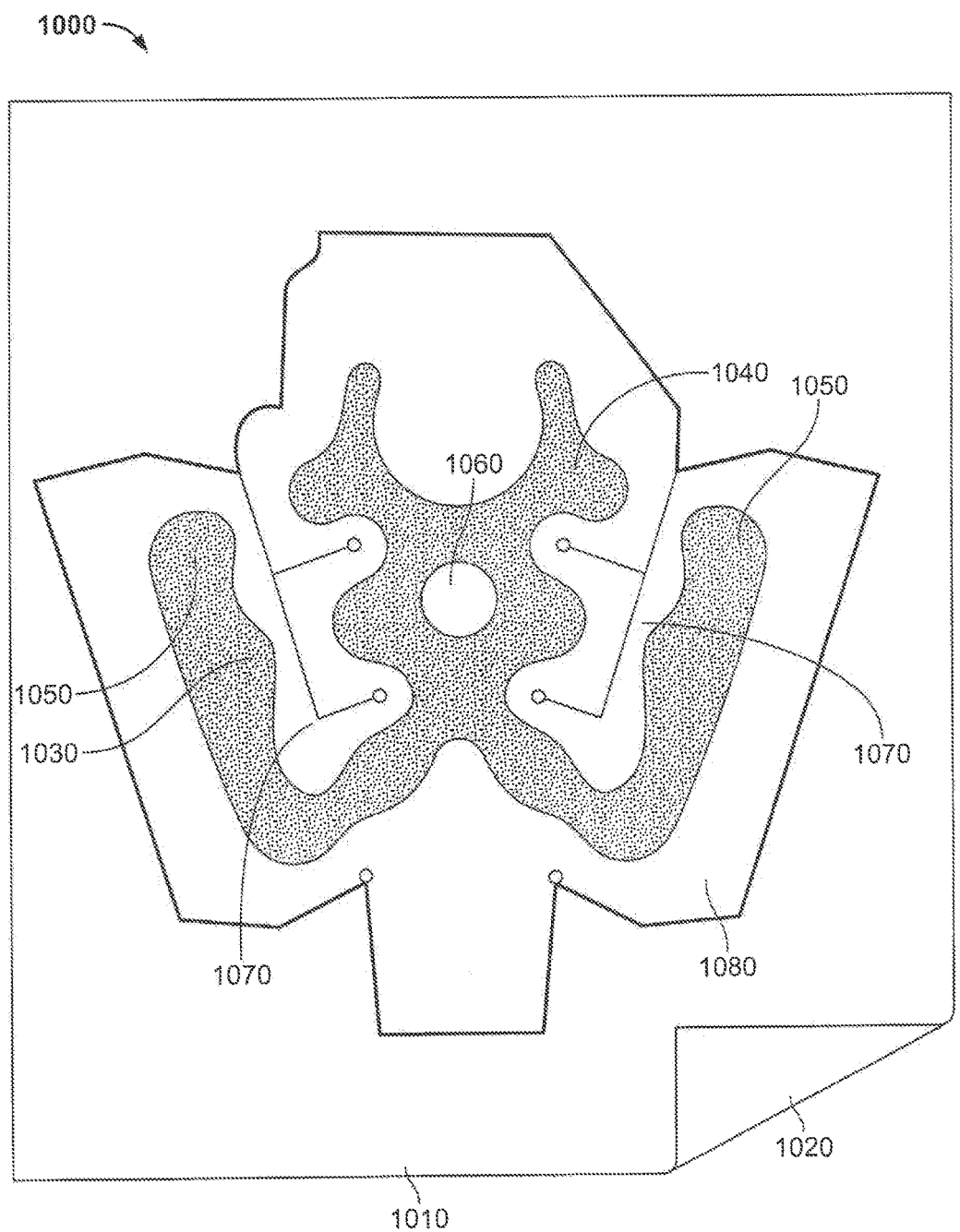
FIG. 10 is a top plan view of a first film of the method of FIG. 9 with a release coating applied thereto.

As shown in FIG. 10, first film 1000 has a length, width and thickness, which defines a first or inner surface 1010 and a second or outer surface 1020. In accordance with step 9(b) of the method of FIG. 9, a release coating 1030 is applied to first surface 1010 of first film 1000 in a pattern corresponding to the configuration of an inflatable compartment of a bladder. Like the barrier material of the method of FIG. 1 (for which "release coating" and "release agent" are interchangeable terms), release coating 1030 prevents first film 1000 from adhering to the second film of the method to form an inflatable compartment (to be described in more detail below). The release coating of the method of FIG. 9 is preferably a silicone-fortified coating that is curable by ultra-violet light to affix the release coating to first surface 1010 of first film 1000. One such silicone-fortified release coating is 08D003D UV, available from Craig Adhesives & Coatings (Newark, N.J.). Obviously, other materials are suitable for use as the release coating of the method of FIG. 9 (including those discussed in paragraphs [0039], [0055] and others herein), so long as such materials can be appropriately applied and affixed to the first film to prevent the first film from adhering to the second film upon the application of heat and pressure (or other bonding techniques to be discussed in more detail below).

Release coating 1030 may be applied to first film 1000 using any suitable technique, including those discussed above in connection with the method of FIG. 1. In a preferred embodiment, release coating 1030 is applied to first surface 1010 of first film 1000 by screen printing. Akin to the screen-printing technique described herein in connection with the method of FIG. 1, a negative image of an inflatable bladder pattern is formed on a screen. With reference to FIG. 11, screen 1110 is positioned above first surface 1010 of first film 1000 on a screen printing unit identified generally as 1120. Release coating 1030 is pulled across screen 1110 by a transfer arm or squeegee 1125 to transfer the pattern corresponding to the inflatable compartments of the inflatable bladder to first surface 1010. It should be noted by those skilled in the art that any screen printing process or machine may be used to accomplish applying step 9(b) of the method.

The inflatable bladder pattern shown in FIG. 10 (which is transferred to first surface 1010 of first film 1000 in FIG. 11) corresponds to a bladder for use in the upper of an article of footwear, and comprises an inflatable instep or tongue compartment 1040 and two inflatable lateral compartments 1050. Inflatable compartments 1040, 1050 are formed in the areas where release coating 1030 passes through screen 1110 to first surface 1010 of first film 1000. The pattern of FIG. 10 further comprises circular area 1060 and generally linear areas 1070. These areas are formed where the release coating does not pass through the screen to the first film and are, thus, non-inflatable. Circular and linear areas 1060, 1070 are provided to control the thickness and inflation of the bladder, and with respect to footwear in particular, to accommodate the anatomy and bone structure of the foot to avoid uncomfortable pressure points.

A perimeter 1080 extends about the periphery of the bladder pattern. Perimeter 1080 is also devoid of release coating 1030, so that the first and second films are able to adhere to each other during the adhering step of the method of FIG. 9. This adhered perimeter ultimately forms an attachment margin that facilitates incorporation of the inflatable bladder into the article of footwear or other article of manufacture, to be discussed in more detail below.

It should be realized by those skilled in the art that while an inflatable tongue bladder is shown in FIG. 10, the inflatable bladder of the method may take any configuration in keeping with its intended purpose or function. For example, for footwear, the inflatable bladder may be configured to fit within the tongue, along the medial and/or lateral sides, around the ankle, or under the arch. Similarly, the inflatable bladder may be designed to fit within the shell of a life preserver, jacket, chest protector, or helmet, or within a glove or any other inflatable article of manufacture. Moreover, the described circular and linear areas (which could, of course, take any shape or geometry) may be placed in any position to meet the functional objectives of the bladder and to control inflation of the bladder, as necessary.

Continuing with the steps of the method of FIG. 9, following application of a release coating to the first surface of the first film, the release coating is cured to the first film by exposing the first film with the applied release coating to a source of ultra violet (UV) light (see Step 9(c)). For example, silicone-fortified release coating 08D003D UV is cured to the first film by application of UV light until cured. Obviously, the requirements for curing the release coating are dependent on the type of release coating and the size of the area to be illuminated. After curing, the release coating is fixed to the first surface of the first film and will not substantially melt, flake, or otherwise degrade upon the application of heat, pressure, ultrasonic energy or the application of other forces, energy or laminating/bonding techniques.

It will be realized by those skilled in the art that the release coating can be cured in accordance with known curing techniques (for example, with a hand-held UV light or a UV light tunnel), so long as the curing technique is appropriate to the formulation and properties of the applied release coating and the remaining steps of the method.

Figure 12:
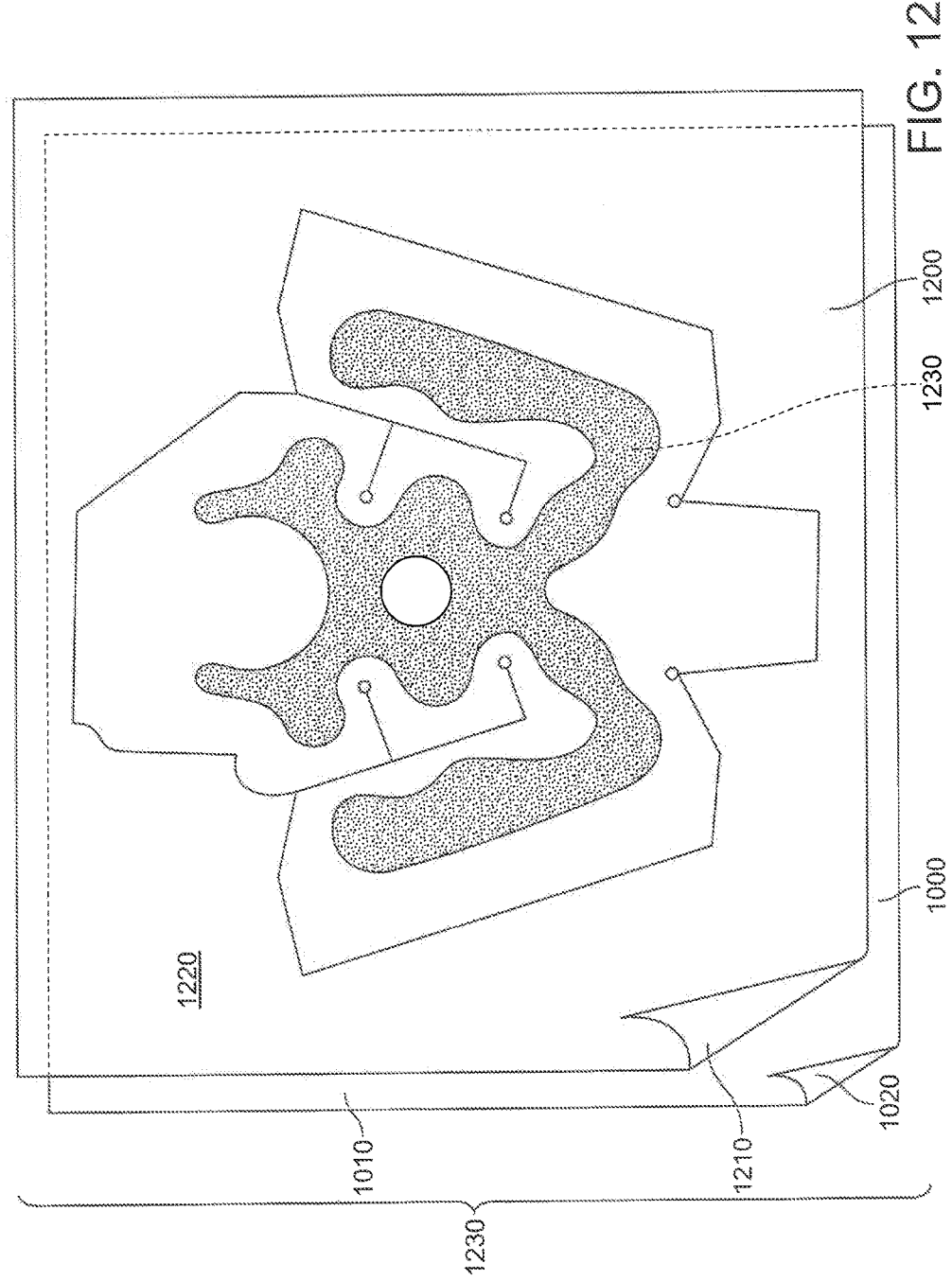
FIG. 12 is a top plan view of a layered element of the method of FIG. 9 comprising the first film, with the release coating cured thereto, and a second film.

Turning now to FIG. 12, and in accordance with Step 9(d) of the method of FIG. 9, a second film 1200 having a first or inner surface 1210 and a second or outer surface 1220 is provided with first film 1000 to form a layered element 1230. More particularly, layered element 1230 is formed by placing first surface 1210 of second film 1200 in facing relationship with cured release coating 1030, such that the release coating is sandwiched or disposed between first surface 1010 of first film 1000 and first surface 1210 of second film 1200. Second film 1200 is formed from the same low density polyethylene film as first film 1000, so that the first and second films are capable of bonding to each other in the later steps of the method of FIG. 9. As noted above with respect to first film 1000, second film 1200 may be formed from any type of thermoplastic or elastomeric film. However, the first and second films should be formed from the same material, similar materials, or compatible materials to allow for the required bonding or sealing between the two films.

Figure 13:
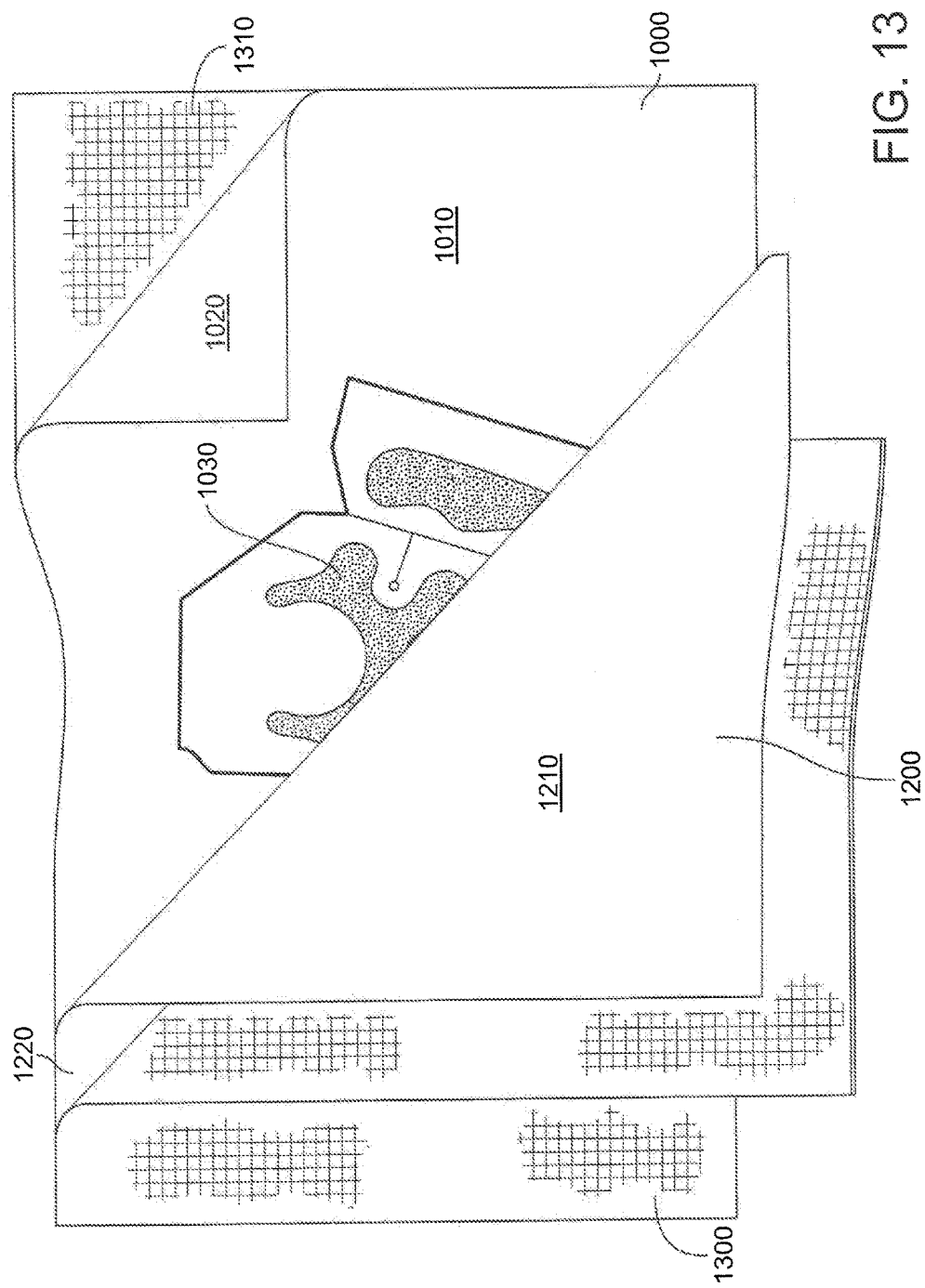
FIG. 13 is a top plan view of the layered element of the method of FIG. 9 positioned between a first ply and a second ply.

In accordance with Step 9(*e*) of the method of FIG. 9, and with reference to FIG. 13, layered element 1230 (i.e., first film 1000 with cured release coating 1030 and second film 1200) is positioned or sandwiched between a first ply of material 1300 and a second ply of material 1310. First and second plies 1300, 1310 are generally not affixed to layered element 1230, but instead layered element 1230 is generally loosely positioned between first and second plies 1300, 1310. First and second plies 1300, 1310 can include at least one textured surface. For example, plies can include a woven surface, a grooved surface, a nubbed surface, a wavy surface, or a combination thereof. In preferred embodiments, at least one of the plies is sufficiently textured to prevent or reduce the entrapment of air near the outer surface of layered element 1230 during the step of adhering first film 1000 to second film 1200. In other embodiments, at least one of the plies is sufficiently textured to prevent or reduce the movement of layered element 1230 during the step of adhering first film 1000 to second film 1200. In some embodiments, the plies can include glass or carbon fibers, fabric, silicon, paper, polyethylene terephthalate (such as biaxially-oriented polyethylene terephthalate), or nylon. For example, the plies can include silicon coated paper, textured silicon sheet, polytetrafluoroethylene sheet, textured biaxially-oriented polyethylene terephthalate, or polytetrafluoroethylene-treated, fiberglass cloth. The plies are preferably resistant to temperatures that are used for adhering first film 1000 to second film 1200. In some embodiments, the plies resist sticking to first film 1000 or second film 1200 during the step of adhering the first and second films together. In some embodiments, the plies are made of a stick-resistant material (e.g., polytetrafluoroethylene). In other embodiments, plies are treated with a stick-resistant material (e.g., polytetrafluoroethylene).

The plies can perform several functions: (1) they can carry the layered element, comprised of the first and second films and release coating, through a laminating process to prevent the layered element from adhering or melting to the heated elements of the laminating apparatus; (2) the woven texture of the cloth can prevent air from being trapped on the first and/or second films (e.g., trapped on one or more surfaces of the films) or can reduce the amount of air being trapped on the first and/or second films, which could cause bubbling, warping, inconsistent lamination between the films, or weak or thin areas in the bladder; (3) the plies can prevent or reduce any unintended pre-heating of the layered element when in the proximity of heated elements of the laminating process (for example, when the layered element is proximate, but not yet inserted into the nip rolls of a rotary lamination machine) and/or (4) the plies can prevent or reduce shifting or movement of the components of the layered element relative to each other.

Examples of polytetrafluoroethylene/fiberglass reinforced material from which first and second plies 1300, 1310 can be made are available from Precision Coating Co., Inc. (Dedham, Mass.), under product nos. PC-10, PC-14, PC-10 TR, PC-10 Porous, PC-14 Porous, 100-8SW2, and 100-10sw. One example of a silicon/fiberglass reinforced material from which first and second plies 1300, 1310 can be made is available from Precision Coating Co., Inc., under product no. PC S/W 10. In some embodiments, the material from which first and second plies 1300, 1310 is made has a thickness of about 5 to about 20 mil (about 0.127 mm to about 0.508 mm) such as about 10 to about 15 mil (about 0.254 mm to about 0.381 mm). Plies 1300, 1310 can be cut or sized to accommodate the dimensions of the layered element sandwiched thereinbetween. While various types of suitable plies have been described, it should be realized by those skilled in the art, that any material which is capable of performing the primary functions above would be suitable for plies 1300, 1310.

Moving on to Step 9(*f*) of the method of FIG. 9, heat and pressure are applied to first and second plies 1300, 1310 (with layered element 1230 positioned thereinbetween) to adhere first film 1000 to second film 1200, except in the area or vicinity where release coating 1030 has been applied to first film 1000 to form an inflatable compartment surrounded by a sealed perimeter. For example, in one embodiment, the first film may be adhered to the second film except where the release coating is present and in the area immediately adjacent to where the release coating is present. In a preferred embodiment of the invention, the heat and pressure applying step of the method is accomplished using a heated drum rotary lamination machine. Using a heated drum rotary lamination machine, heated fluid (e.g., oil) from an auxiliary source can be circulated through a rotary drum of the machine, which in turn radiates and applies heat to the films brought near the rotary drum. A heated drum rotary lamination machine is desirable, as the heated fluid circulated through the drum provides an even temperature across the surface of the drum, to provide for consistent melting and, thus, high-integrity bonding or lamination of the films.

Figure 14:
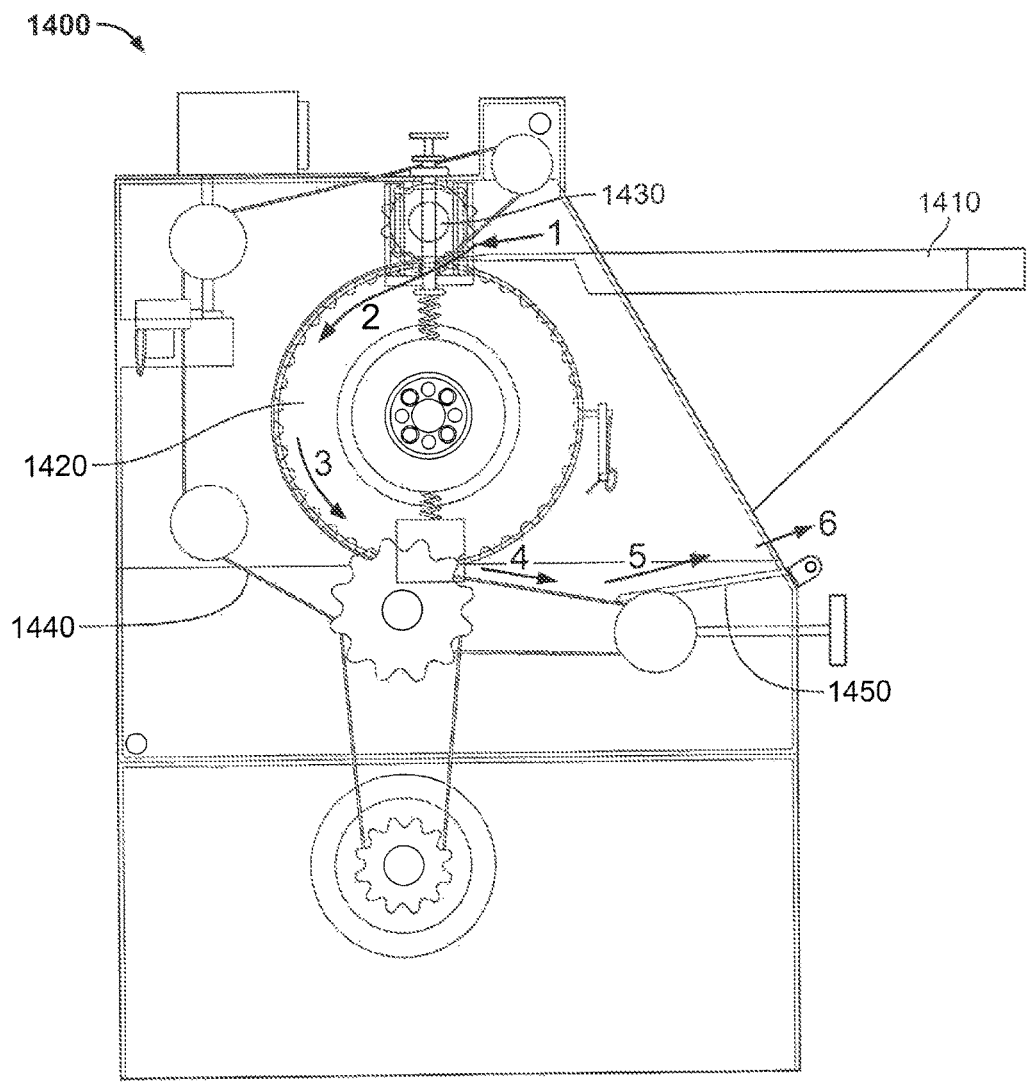
FIG. 14 is a side schematic view of a rotary lamination machine according to an embodiment of the present invention.

A rotary lamination machine 1400 is shown in FIG. 14. Rotary lamination machine 1400 comprises, among other things, a stand-off feed tray 1410, a heated rotary drum 1420, a nip roll 1430, a conveyor belt 1440, and a spring-loaded exit tray 1450. To utilize rotary lamination machine 1400 to perform the adhering step (Step 9(*f*)) of the method of FIG. 9, first and second plies 1300, 1310 with layered element 1230 positioned thereinbetween are brought to the machine and placed on stand-off feed tray 1410 to reduce unintended pre-heating of the combined plies and layered element. The plies are then fed into the machine by nipping or pinching them between nip roll 1430 and heated rotary drum 1420 in the direction of arrow 1 shown in FIG. 14. The plies are then carried against and around the heated rotary drum via conveyor belt 1440 (arrow 2). Like plies 1300, 1310, conveyor belt 1440 can be formed from a material similar to that described for use in plies 1300, 1310 to facilitate movement of the plies around the heated rotary drum and to prevent the first and second films from sticking or adhering to the belt during the laminating process. In one embodiment, conveyor belt 1440 can be formed from such a material and layered element 1230 is placed directly on conveyor belt 1440 without using one or both of plies 1300, 1310. For example, the conveyor belt can be made of polytetrafluoroethylene/fiberglass material to facilitate movement of the layered element 1230 around the heated rotary drum and to prevent the first and second films from sticking or adhering to the belt during the laminating process.

To bond or adhere first and second films 1000, 1200, rotary drum 1420 of machine 1400 is heated to operate at a temperature and set to run at a speed that is dependent upon the selection of films 1000, 1200, barrier material 80 (e.g., release coating 1030), and plies 1300, 1310, but which temperature and speed are selected to be sufficient to melt at least one of the films at least partially and in some embodiments, to completely melt at least one or both of the films, and to ensure proper melting and bonding of the films 1000, 1200. As plies 1300, 1310 are carried about the heated rotary drum (and pressure is applied to the plies and layered element by the drum and conveyor belt), first and second films 1000, 1200 melt and bond or adhere to each other except in the area where release coating 1030 has been applied to first film 1000. Conveyor belt 1440 carries plies 1300, 1310 with layered element thereinbetween to the lowermost tangential point of the heated rotary drum (arrows 3 and 4), where it then conveys the plies away from the drum and toward a spring loaded tray 1450 (arrow 5) that allows for removal of the plies and the now-adhered first and second films disposed thereinbetween from the rotary lamination machine (arrow 6).

While the adhering step has been described in connection with a heated rotary lamination machine, it should be understood by those skilled in the art that other laminating techniques can be utilized to accomplish the objectives of the methods described herein, including, but not limited to, use of a pressure source and a heat source. Examples of suitable pressure sources include presses (e.g., a hydraulic press) and application of vacuum (e.g., via vacuum bag or vacuum table). Examples of suitable heat sources include heated plates; heat lamps (e.g., infrared lamps); conventional, convection, or microwave ovens; and resistance heaters, among others.

In one embodiment, an ultrasonic bonding horn is used to perform the adhering step. The use of an ultrasonic bonding horn can include ultrasonic rotary/continuous bonding horn techniques such as those which include assembling two or more layers of materials by passing them between a vibrating horn and a rotary drum wherein high frequency mechanical motion of a vibrating horn and compressive force between the horn and a rotary drum create frictional heat at the point where the horn contacts the material(s).

In another embodiment, the adhering step can include application of vacuum. Application of vacuum can prevent air from being trapped on the first and/or second films (e.g., trapped on one or more surfaces of the films) or can reduce the amount of air being trapped on the first and/or second films during the adhering step and can prevent or reduce shifting or movement of the components of the layered element relative to each other during the adhering step.

For example, films 1000, 1200 can be placed between plies 1300, 1310 and the resulting layered element 1230 can be subjected to vacuum and heat and/or additional pressure. In one embodiment, layered element 1230 is placed into a vacuum bag and vacuum is drawn on the bag. Heat and/or additional pressure (e.g., via a press) can then be applied to the vacuum bag and layered element 1230 causing first and second films 1000, 1200 to melt and bond or adhere to each other except in the area where release coating 1030 has been applied to first film 1000. In another embodiment, layered element 1230 can be placed on a vacuum table, covered with a sheet or film, vacuum drawn on the layered element 1230, and heat and/or additional pressure (e.g., via a press) can then be applied to the layered element.

Obviously, other laminating techniques and devices known in the art for bonding or laminating thermoplastic or elastomeric films and materials would be suitable for achieving the objectives of the present invention.

Following removal of the plies and now-adhered first and second films from the rotary lamination machine, the plies and films are cooled. After cooling, plies 1300, 1310 are removed from the layered element by peeling ply 1300 from second film 1200 and ply 1310 from first film 1000 (Step 9(*g*) of the method). Plies 1300, 1310 can be conveniently and efficiently reused for the additional lamination of films. As stated previously, plies 1300, 1310, particularly textured plies, advantageously can prevent or reduce (a) air being trapped on the first and/or second films, and (b) shifting or movement of the components of the layered element relative to each other, both of which could result in an inconsistent bond or a bond of compromised integrity. With this lamination technique, the resulting adhered films are substantially flat across the surfaces thereof (that is, there are no raised weld lines, seams, ridges or bulges). This facilitates manipulation of the film for assembly of the inflatable bladder into the article of footwear or other article of manufacture.

It should also be noted that following the melting and lamination of films 1000, 1200, any textured surface (or warp and weave) of plies 1300, 1310 can be imparted to second or outer surface 1020 of first film 1000 and second or outer surface 1220 of second film 1200. This texturing of films 1000, 1200 (partially represented as texture T in FIG. 15) can improve handling and attachment of the inflatable bladder into an article of footwear (or to the structure thereof), particularly, if such attachment is by means of a liquid adhesive, as the adhesive is able to flow into the recesses of the textured surface to improve the bond.

Figure 15:
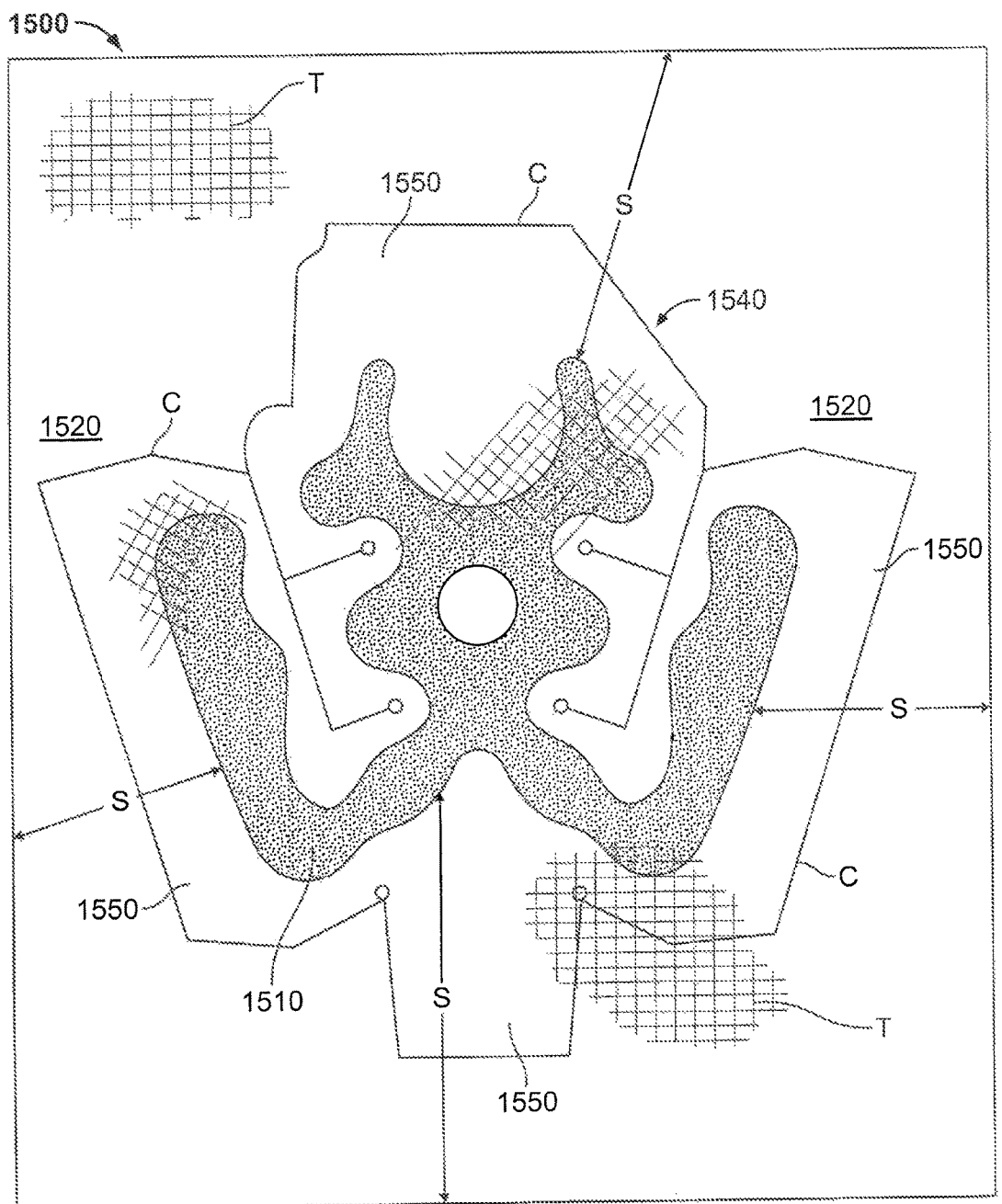
FIG. 15 is a top plan view of the adhered first and second films, with the release coating cured thereinbetween, showing the texture imparted to the films by the first and second plies of material according to an embodiment of the present invention.

As stated above, first film 1000 is adhered to second film 1200 except in the area where the barrier material has been applied to form an inflatable compartment surrounded by a fully sealed perimeter. FIG. 15 is a top plan view of adhered first and second films 1500 adhered together except in the area where the barrier material, e.g., release coating 1030, has been applied to form an inflatable compartment 1510 surrounded by a sealed perimeter 1520 and sealed attachment margin 1550. Unlike conventional radio frequency (RF) welding that forms weld lines or seams only in the vicinity where RF energy has been applied to a film, perimeter 1520 (formed by adhered films 1000, 1200) is adhered from the edge of the inflatable compartment (i.e., the edge of the barrier material) across the entire surface thereof to the edges of the adhered films, as shown by arrows S in FIG. 15.

Turning now to Step 9(*h*) of the method of FIG. 9, and with continuing reference to FIG. 15, an inflatable bladder can be cut from the now-adhered films by cutting the sealed perimeter of the films along a cut line C to form an inflatable bladder 1540 with a sealed attachment margin 1550. Inflatable bladder 1540 can be cut from the adhered films using any suitable means, including any of the cutting means previously discussed in this disclosure.

Finishing with Step 9(*i*) of the method shown in FIG. 9, the inflatable bladder is incorporated into an article of footwear or other article of manufacture by attaching inflatable bladder 1540 to the article of footwear at attachment margin 1550. The inflatable bladder of the method of FIG. 9, with the fully sealed attachment margin 1550, is particularly well suited for incorporation into articles of manufacture (including, but not limited to, footwear), because it can be textured (for improved handling), is substantially flat along its surface, and has an attachment margin comprised of sealed films for improved attachment to the article of manufacture. More specifically, RF welded bladders can be difficult to assemble into footwear, for example, because the weld lines can cause the films of the bladder to curl or buckle along the weld lines. This curling can interfere with placement and attachment of the bladder to the article of footwear. In addition, with RF welding, the films are attached only at the weld lines, which leaves the films separate from each other along the exterior edge of the inflatable bladder (i.e., at the attachment margin). Because the films of the inflatable bladder are not adhered, special care must be taken to ensure (1) that a stitch line goes through both films of the attachment margin (if adhered to the article of footwear by stitching), (2) that an adhesive is applied to both films (if adhered to the article of footwear by adhesive) to ensure that the inflatable bladder is adequately attached to the article of footwear and is capable of withstanding the forces and increased pressure that will be applied to the inflatable bladder at the margin, or (3) that at least a portion of the unadhered portion of the films is cut away. The substantially flat and adhered films of attachment margin 1550 formed by the method of FIG. 9 provide for easy and effective attachment of the inflatable bladder to the article of footwear (or other article of manufacture).

Figure 16:
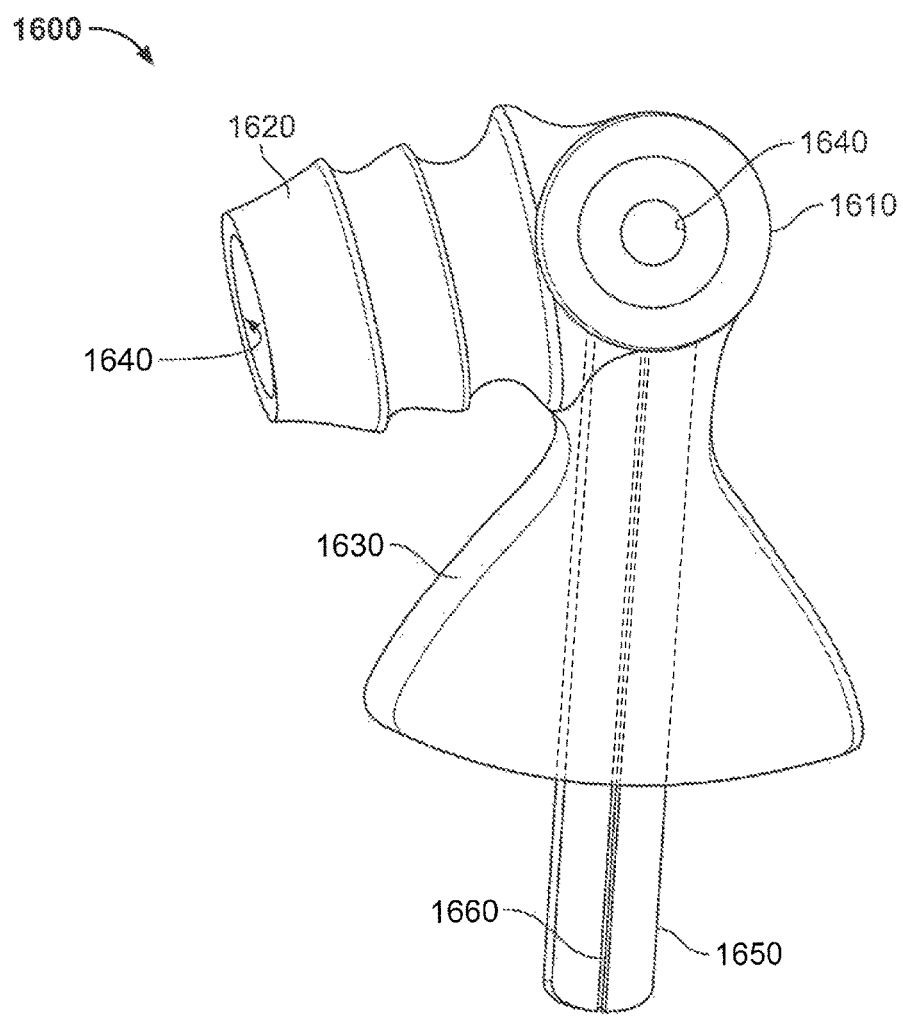
FIG. 16 is a top plan view of a valve body according to an embodiment of the present invention.

Having described the fundamental steps of the method of FIG. 9 of the present invention, attention will now be given to other or optional steps. The inflatable bladder of the present invention can be permanently inflated (i.e., air is permanently sealed in the inflatable compartment of the bladder) or inflation of the inflatable bladder can be customized by the user by attaching an inflation device and a deflation device to the inflatable compartment of the bladder. The steps for attaching one type of inflation and deflation device will now be described with respect to the inflatable bladder formed by the method of FIG. 9. FIG. 16 shows a valve body 1600 having an open-ended plunger housing 1610, an open-ended pump connector 1620, and an open-ended sealing collar 1630. Plunger housing 1610, connector 1620 and sealing collar 1630 are fluidly connected by a conduit 1640 that extends through and between pump connector 1620, plunger housing 1610 and sealing collar 1630. A tongue 1650 with a centrally disposed groove or channel 1660 is disposed within and extends from sealing collar 1630. Tongue 1650 is molded with valve body 1600 at the juncture of open-ended plunger housing 1610 and sealing collar 1630. While tongue 1650 is centrally positioned within sealing collar 1630, it does not block or obstruct conduit 1640.

Valve body 1600 is formed from a material compatible with the material used to form first film 1000 and second film 1200 (e.g., low density polyethylene), to enable the valve body to be sealed thereto. Valve body 1600 may be formed from any material that enables the valve body to be sealed or bonded to the films of the inflatable bladder in a fluid-tight manner.

Figure 17:
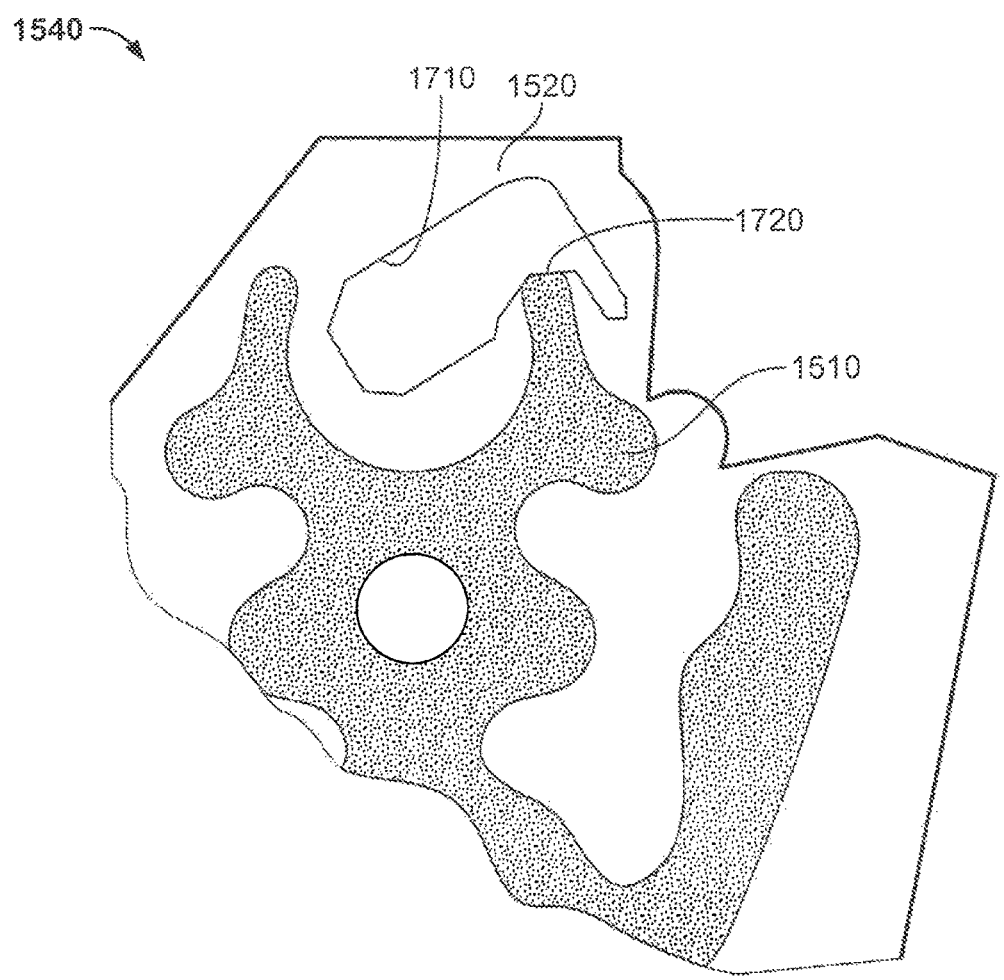
FIG. 17 is a partial top plan view of an inflatable bladder according to an embodiment of the present invention, with part of the bladder cut-away to provide for attachment of an inflation and deflation device.
Figure 18:
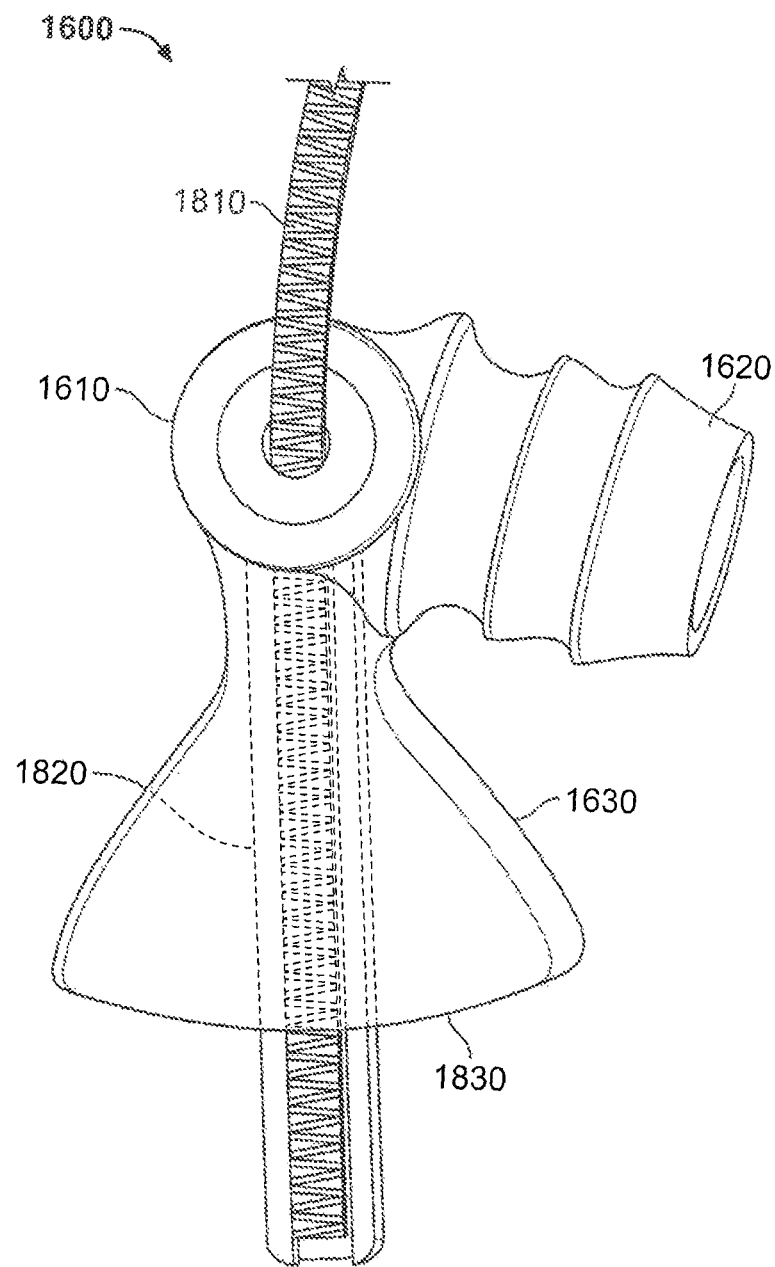
FIG. 18 is a perspective view of the valve body and inserted cloth strand according to an embodiment of the present invention.

With reference now to FIG. 17, a partial plan view of inflatable bladder 1540 is shown. To attach valve body 1600 to inflatable bladder 1540, a portion of sealed perimeter 1520 and neighboring inflatable compartment 1510 is cut away, as shown at 1710. Ideally, inflatable compartment is cut away at an area that corresponds in width to the tongue and sealing collar of the valve body. As shown in FIG. 17, inflatable compartment 1510 has been cut across its width to form a fluid inlet 1720 into the inflatable compartment. To attach valve body 1600 to the inflatable bladder, and as shown in FIG. 18, a removable polytetrafluoroethylene/fiberglass cloth strand 1810 is inserted into valve body 1600 to create a positive air channel during sealing of the valve body to the inflatable bladder (to be discussed in more detail below). Valve body 1600 with cloth strand 1810 is inserted into the open end of plunger housing 1610 and thread through conduit 1640 to sealing collar 1630. From sealing collar 1630, cloth strand 1810 is fed along the length of tongue 1650 and over centrally disposed channel 1660. Tongue 1650 (with cloth strand 1810 over centrally disposed channel 1660) is then fed into now cut-open fluid inlet 1720, such that the tongue and cloth strand are situated within a length of inflatable compartment 1510, an upper portion 1820 of sealing collar 1630 is in contact with second film 1200, and a lower portion 1830 of sealing collar 1630 is in contact with first film 1000. Inflatable bladder 1540, with valve body 1600 and cloth strand 1810 inserted therein, is then put into top and bottom heated sealing dies, which are pressed closed to apply heat and pressure to only the edges of the upper and lower portions of sealing collar 1630 to bond or seal the sealing collar (and thus the valve body) to the first and second films of the inflatable bladder. It should be noted that holding fixtures and polytetrafluoroethylene/fiberglass cloths may be employed to protect the valve body from contact with the heated sealing dies, which could result in melting or degradation of the valve body. Although the sealing collar is now sealed or bonded to the first and second films of the inflatable bladder, cloth strand 1810 prevents the second or upper film of the inflatable bladder from bonding to tongue 1650 adjacent to cloth strand 1810 or centrally disposed channel 1660.

Figure 19:
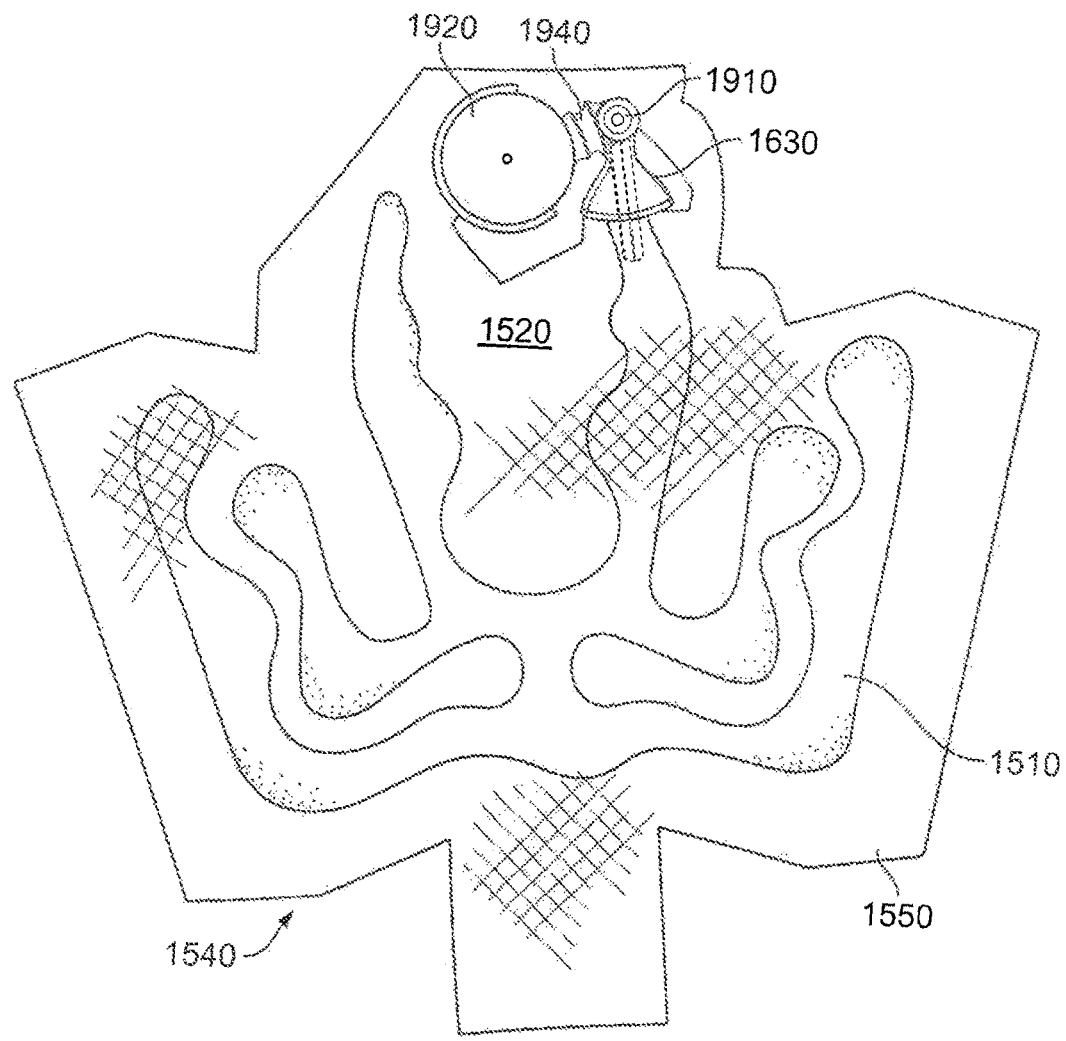
FIG. 19 is a top plan view of a finished inflatable bladder according to an embodiment of the present invention, with an attached inflation device and deflation device, manufactured in accordance with the method of FIG. 9.

Following the application of heat and pressure to the sealing collar, the inflatable bladder and holding fixtures are moved to a cooling die station. The cooling dies may have a silicone sponge insert that applies soft compliant pressure to the seal of the valve body, to maintain the valve seal shape. When valve body seal has cooled, cloth strand 1810 is removed from conduit 1640 of valve body 1600 to provide for an open fluid conduit between the structure of the valve body and the interior of the inflatable bladder compartment, to allow for the ingress and egress of air (fluid) from the inflatable bladder. Following removal of cloth strand 1810, a conventional valve plunger 1910 and spring are press-fit (by a manually operated arbor press) into plunger housing 1610 of valve body 1600 (FIG. 19). To complete formation of the inflation and deflation device, a digital ball pump 1920 with an open-ended stem 1940 is affixed to the valve body 1600.

Obviously, other inflation and deflation devices known in the art may be fluidly connected to the inflatable bladder manufactured by the method of FIG. 9, including but not limited to those discussed in paragraphs [0065] et al. herein.

It is also contemplated that films 1000 and 1200 of the method of FIG. 9 need not be a single ply of material. Indeed, either or both of the films may be a laminate of a polymer material and a substrate (of one or more layers) applied to only one side of the polymer layer (permitting the opposite side of the polymer layer to be bonded to the second film (or laminate)). Examples of fabrics or other substrates that could be laminated to the films of the method of FIG. 9 include non-woven materials, polyester knits, nylon films, polyester films such as biaxially-oriented polyethylene terephthalate film, and those materials disclosed in paragraph [0038] herein. In some embodiments, either or both films 1000 and 1200 can include a high melting point layer of polymer material and a low melting point layer of polymer material. For example, both films 1000 and 1200 can include a high melting point layer and a low melting point layer and the method of FIG. 9 can be performed by disposing a barrier material between the low melting point layers of films 1000 and 1200 and applying heat and pressure to adhere the low melting point layer of film 1000 to the low melting point layer of film 1200 except in the vicinity of the barrier material.

It is further envisioned that the method of FIG. 9 could be made continuous or semi-continuous similar to the method of FIG. 1. For example, and similar to the process of FIG. 7 described herein, the release coating of the method of FIG. 9 could be continuously "printed" on a web or roll of first film laminate of a polymer material and a substrate to allow for the continuous and efficient application of the release coating to the polymer material of the film laminate. Similarly, the first film laminate of the method (with the applied release coating) could be positioned adjacent to a second film laminate of a polymer material and heat and pressure applied to adhere the polymer materials of the laminates except in the vicinity of the release coating. In some instances, the substrates are materials of substantially higher melting points than the polymer materials such that the substrates do not soften during the application of heat and pressure. In some embodiments, one or both of the substrates of the laminates are textured and are not smooth. In example embodiments, the substrate is a smooth or textured polyester film such as biaxially-oriented polyethylene terephthalate film (e.g., Mylar® film) or the like. One, both, or neither of the substrates can be subsequently removed from the adhered layers. In an alternative example, and similar to the process of FIG. 7 described herein, the release coating of the method of FIG. 9 could be continuously "printed" on a web or roll of first film laminate of a polymer material. The first film laminate (with the applied release coating) could be positioned adjacent to a second film of a polymer material, the films fed between two plies of material (e.g., continuous rolls of cloth or other textured surfaces), and heat and pressure applied to the plies to adhere the polymer materials of the laminates except in the vicinity of the release coating.

It should be appreciated that while the method of FIG. 9 has been described in connection with inflatable bladders for footwear, the steps thereof are equally applicable to the formation of inflatable bladders for any article of manufacture. Indeed, the methods of FIGS. 1 and 9 provide for the formation of inflatable bladders that are high-quality, customizable or easily-modified in configuration, inexpensive and simple to manufacture, and easily assembled into the article of manufacture for which the inflatable bladder is intended.

Figure 20:
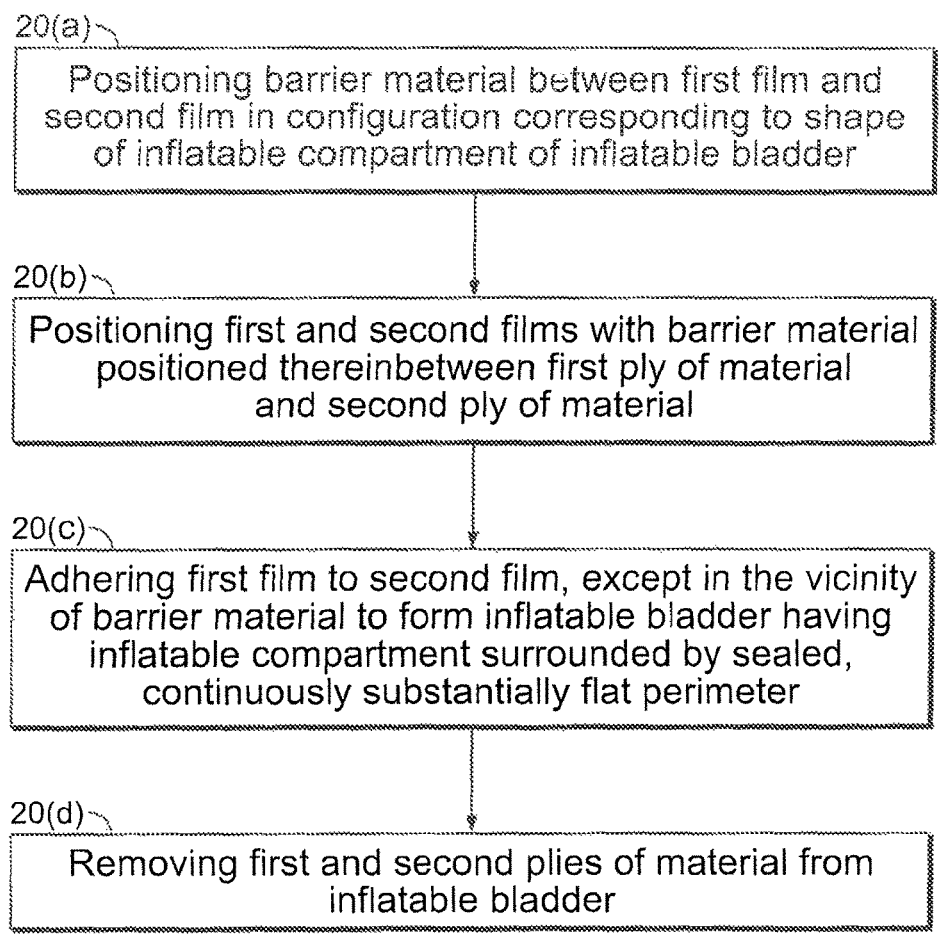
FIG. 20 illustrates the steps of a method according to another embodiment of the present invention for manufacturing an inflatable bladder.

Another embodiment of a method for manufacturing an inflatable bladder is shown in FIG. 20. With reference to FIG. 20, the method comprises the steps of: 20(*a*) positioning a barrier material between a first film and a second film in a configuration corresponding to the shape of an inflatable compartment of an inflatable bladder, 20(*b*) positioning the first and second films with the barrier material positioned thereinbetween between a first ply of material and a second ply of material, 20(*c*) adhering the first film to the second film, except in the vicinity of the barrier material to form an inflatable bladder having an inflatable compartment surrounded by a sealed, continuously substantially flat perimeter, and 20(*d*) removing the first and second plies of material from the inflatable bladder. One or more of the materials and/or techniques described herein in connection with the manufacturing methods of FIGS. 1 and 9 may be employed individually or in combination in the steps of the method of FIG. 20. For example, the barrier material of Step 20(*a*) may be a curable release coating as previously described. In such an embodiment, the positioning step of Step 20(*a*) may further comprise the substeps of applying the release coating to the first film, curing the release coating to the first film, and sandwiching the cured release coating between the first film and the second film. The release coating could be applied to the first film using a screen, template, stencil or other technique disclosed herein. The release coating could be cured by the application of ultra violet light or by other curing means disclosed herein. The first and second plies of material may be textured and could be formed from polytetrafluoroethylene-coated, fiberglass-reinforced cloths or any other suitable material described herein. Adhering Step 20(*c*) of the method could be accomplished by rotary lamination, by heated pressing between platens, by application of vacuum and heat, or by any other adhering technique described herein. A suitable inflation device and deflation device could also be coupled to the inflatable bladder to allow, respectively, for the introduction and release of fluid (e.g., air) from the inflatable bladder. The inflatable bladder formed by the method of FIG. 20 may be suitable for incorporation into any article of manufacture (including, but not limited to, footwear or other athletic gear), and may be cut to size to facilitate the same in accordance with the techniques disclosed herein.

Further, in some inflatable articles of manufacture (e.g., footwear or protective vests), the inflatable bladder needs to bend to accommodate movement of the wearer or other functionality, and with certain inflatable bladder configurations, this can cause pinching or blockage of a fluid (e.g., air) passage within the bladder, to prohibit complete inflation or deflation thereof. A novel solution to this problem is to texturize the interior surface of the bladder. In one embodiment of the present invention, this may be accomplished using a variety of techniques including by texturing the interior surface of one or both of the films of the bladder. In another technique, a release coating is applied to the interior surface of one of the films in a pattern corresponding to the configuration of the inflatable bladder, while a discontinuous coating is applied to the interior surface of the other film. The discontinuously applied release coating layer could be a pattern of dots, lines, or other shapes that lend texture to the interior surface of the film to assist in keeping the fluid channels of the bladder open. The area of the discontinuously applied layer devoid of release coating could be oriented in the anticipated primary direction of fluid flow. Alternatively, both of the interior surfaces of the bladder films could have a discontinuously applied release coating layer, such that the release coating layer applied to one film overlaps with the release coating layer applied to the other film, permitting the release coating layers to work together to prevent adherence of the films to produce the desired inflatable compartment. In still other embodiments, a barrier material such as foil, paper, or fabric may be used in the vicinity of an anticipated bend in the inflatable bladder to help keep the fluid channel open in that area. It should be realized by those skilled in the art that the afore-described texturizing techniques may be employed with any of the methods described in FIG. 1, 9, or 20, or with any other method disclosed herein and/or contemplated by the concepts and spirit of the present invention.

The foregoing description of the specific embodiments will so fully reveal the general nature of the invention that others can, by applying the knowledge within the skill of the relevant art (including the contents of the references cited herein), readily modify and/or adapt for various applications such specific embodiments, without undue experimentation, without departing from the general concept and spirit of the present invention. Therefore, such adaptations and modifications are intended to be within the meaning and range of equivalents of the disclosed embodiments, based on the teaching and guidance presented herein. It is to be understood that the phraseology or terminology used herein is for the purpose of description and not of limitation, such that the terminology or phraseology of the present specification is to be interpreted by the skilled artisan in light of the teachings and guidance presented herein, in combination with the knowledge of one of ordinary skill in the art.

What is claimed is:

1. An inflatable article of footwear comprising:
   (a) a sole; and
   (b) an upper attached to said sole, said upper including an inflatable bladder, said inflatable bladder comprising:
      (i) a first film;
      (ii) a barrier material applied to said first film in a pattern that corresponds to the shape of an inflatable compartment of said inflatable bladder; and
      (iii) a second film adhered to said first film such that said barrier material is disposed between said first film and said second film, and said first film and said second film do not adhere in the vicinity of the barrier material thereby forming said inflatable compartment with a peripheral edge,
   wherein said inflatable bladder is devoid of raised weld lines or raised adhering seams and
   wherein at least a portion of the exterior surface of said inflatable bladder is textured.

2. The inflatable article of footwear of claim 1, wherein substantially all of said exterior surface of said inflatable bladder is textured.

3. The inflatable article of footwear of claim 2, wherein said textured exterior surface of said inflatable bladder corresponds to the texture of a ply of textured material that was positioned adjacent to said exterior surface of at least one of said first film or said second film while said first and second films were adhered to each other.

4. The inflatable article of footwear of claim 3, wherein said ply of material is a polytetrafluoroethylene-coated, fiberglass-reinforced cloth.

5. The inflatable article of footwear of claim 1, wherein said inflatable bladder includes a substantially flat, adhered attachment margin extending from said peripheral edge of said inflatable compartment to an edge of said inflatable bladder, to facilitate attachment of said inflatable bladder to said upper of the article of footwear.

6. The inflatable article of footwear of claim 1, wherein said barrier material is a curable release coating cured by the application of ultra violet light.

7. The inflatable article of footwear of claim 1, wherein at least one of said films is a polymer layer bonded to a substrate.

8. The inflatable article of footwear of claim 1, wherein said inflatable bladder forms at least a portion of an outer surface of the upper.

9. The inflatable article of footwear of claim 1, further comprising an inflation device and a deflation device in fluid communication with said inflatable bladder.

10. An inflatable article of footwear comprising:
   (a) an upper;
   (b) a sole attached to said upper; and
   (c) an inflatable bladder attached to the article of footwear, said inflatable bladder comprising:
      (i) a first single-layered film having an inner surface and a textured outer surface;
      (ii) a barrier material applied to said inner surface of said first single-layered film in a pattern that corresponds to the shape of an inflatable compartment of said inflatable bladder;
      (iii) a second single-layered film having an inner surface and a textured outer surface disposed in facing relationship with and adhered to said first single-layered film such that said barrier material is disposed between said inner surface of said first single-layered film and said inner surface of said second single-layered film, said barrier material preventing said first single-layered film from adhering to said second single-layered film in the area where said barrier material is applied to form said inflatable compartment of said inflatable bladder.

11. The inflatable article of footwear of claim 10, wherein the texture of said textured outer surface of said first and second single-layered films is imparted thereto by a woven material disposed adjacent to said outer surfaces of said first and second single-layered films during adherence of said first single-layered film to said second single-layered film.

12. The inflatable article of footwear of claim 11, wherein said woven material is a polytetrafluoroethylene-coated, fiberglass-reinforced cloth.

13. The inflatable article of footwear of claim 10, wherein said inflatable bladder includes a substantially flat, adhered attachment margin extending from a peripheral edge of said inflatable compartment to an edge of said inflatable bladder, to facilitate attachment of said inflatable bladder to said article of footwear.

14. The inflatable article of footwear of claim 13, wherein said inflatable bladder forms at least a portion of an outer surface of the upper.

15. The inflatable article of footwear of claim 10, wherein said barrier material is a curable release coating cured by the application of ultra violet light.

16. The inflatable article of footwear of claim 10, further comprising an inflation device and a deflation device in fluid communication with said inflatable bladder.

17. An inflatable article of manufacture:
   an inflatable bladder, said inflatable bladder comprising:
      (a) a first film;
      (b) a barrier material applied to said first film in a pattern that corresponds to the shape of an inflatable compartment of said inflatable bladder; and
      (c) a second film adhered to said first film such that said barrier material is disposed between said first film and said second film, and said first film and said second film do not adhere in the vicinity of the barrier material thereby forming said inflatable compartment with a peripheral edge,
   wherein said inflatable bladder is devoid of raised weld lines or raised adhering seams and
   wherein at least a portion of the exterior surface of said inflatable bladder is textured.

18. The inflatable article of manufacture of claim 17, wherein said textured exterior surface of said inflatable bladder corresponds to the texture of a ply of textured material positioned adjacent to said exterior surface of at least one of said first film or said second film while said first and second films were adhered to each other.

19. The inflatable article of manufacture of claim 17, wherein said inflatable bladder includes a substantially flat, adhered attachment margin extending from said peripheral edge of said inflatable compartment to an edge of said inflatable bladder, to facilitate attachment of said inflatable bladder to said article of manufacture.

20. The inflatable article of manufacture of claim 17, wherein said barrier material is a curable release coating cured by the application of ultra violet light.

* * * * *